(12) United States Patent
Khan et al.

(10) Patent No.: US 12,499,415 B2
(45) Date of Patent: Dec. 16, 2025

(54) SYSTEM AND METHOD FOR TEMPLATE CREATION, CONFIGURATION, AND IDENTIFICATION

(71) Applicant: Honeywell International Inc., Charlotte, NC (US)

(72) Inventors: Kalimulla Khan, Morris Plains, NJ (US); Wade Lindsey, Canton, GA (US); Srihari Jayathirtha, Johns Creek, GA (US); Syed Khaja Afzal Hussaini, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 362 days.

(21) Appl. No.: 18/178,457

(22) Filed: Mar. 3, 2023

(65) Prior Publication Data

US 2024/0112134 A1 Apr. 4, 2024

Related U.S. Application Data

(60) Provisional application No. 63/377,606, filed on Sep. 29, 2022.

(51) Int. Cl.
*G06Q 10/087* (2023.01)

(52) U.S. Cl.
CPC .................. *G06Q 10/087* (2013.01)

(58) Field of Classification Search
CPC ......... G06Q 10/087; G06Q 10/063112; G06Q 10/063116; G06Q 10/047;
(Continued)

(56) References Cited

U.S. PATENT DOCUMENTS

2003/0154144 A1* 8/2003 Pokorny ............ G05B 13/0285
705/28
2003/0158795 A1* 8/2003 Markham ............. G06Q 10/10
705/28
(Continued)

FOREIGN PATENT DOCUMENTS

CN 108876121 A * 11/2018 ....... G06Q 10/06311
EP 2913788 A1 * 9/2015 ........... G06F 17/243

OTHER PUBLICATIONS

Extended European Search Report Mailed on Jan. 31, 2024 for EP Application No. 23196192, 12 page(s).
(Continued)

*Primary Examiner* — Russell S Glass
(74) *Attorney, Agent, or Firm* — ALSTON & BIRD LLP

(57) ABSTRACT

A method is provided for creating and organizing tasks and events in a warehouse environment. The method includes determining, based on information received from a data ingestion pipeline and a system integration framework, that a worker is requesting a template to generate a task or event; retrieving the template from a memory, the template having information corresponding to the task or the event associated with the connected warehouse; sending the template to the worker computing device associated with the worker requesting the template; sending a prompt to input data into the template on the worker computing device; uploading the data from the template to a dashboard accessible from the plurality of worker computing devices, the data indicating the creation of a new task and/or a new event.

20 Claims, 25 Drawing Sheets

(58) Field of Classification Search
CPC ..... G06Q 10/063118; G06Q 10/06311; G06Q 10/08; G06Q 10/1097
USPC .......................................................... 705/28
See application file for complete search history.

(56) References Cited

U.S. PATENT DOCUMENTS

| | | | |
|---|---|---|---|
| 2008/0046556 A1* | 2/2008 | Nicholls | H04L 67/55 709/224 |
| 2018/0276608 A1* | 9/2018 | Stadie | B66F 9/063 |
| 2019/0340396 A1* | 11/2019 | Mills | G06Q 10/087 |
| 2021/0272044 A1* | 9/2021 | Lee | G06Q 10/083 |
| 2022/0198565 A1* | 6/2022 | Krishnaswamy | G06Q 10/06313 |

OTHER PUBLICATIONS

GB Combined Search Report and Abbreviated Examination Report Mailed on Mar. 11, 2024 for GB Application No. 2314364, 9 page(s).

* cited by examiner

EVENTS OVERVIEW  600

| TOTAL EVENTS | ACTIVE INCIDENT | EVENT PRIORITY | | AUTO-TASK SUMMARY | | LAST 90 DAYS ∨ |
|---|---|---|---|---|---|---|
| 134 | 34 | ▪HIGH 628 ▫MEDIUM 422 ▫LOW 184 | | 18 IN PROGRESS  43 DELAYED | AVG. INCIDENT DURATION 22 MIN. 12%↗ SINCE LAST WEEK | |

EVENT LOG  610    🔍 EVENT LOG  |⊞ FILTER & SORT ∨ |  REPORT INCIDENT

SHOWING 365 OF 1,234 EVENTS | LAST 90 DAYS ✕ | CLEAR FILTERS

| ☐ | EVENT NAME | TYPE ∨ | PRIORITY → | STATUS ∨ | SAFETY ISSUE ∨ | IMPACTED AREA/OPERATION ∨ | REPORT TIME | REPORTED BY |
|---|---|---|---|---|---|---|---|---|
| ☐○ | INVENTORY SPILL AT DOCK DOOR 17 | INCIDENT | ▪HIGH | •ACTIVE | ⚠YES | RECEIVING DOCK DOOR 17 | 2 MIN AGO | JANIE GARK |
| ☐○ | BROKEN AND HOT WIRE CONNECTED TO CONVEYOR 4402 | INCIDENT | ▪HIGH | •ACTIVE | | SORTING FLOOR CONVEYOR 4402 | 30 MIN AGO | KITH P JOSE |
| ☐○ | BLOCKED PATH AT SHIPPING HALLWAY #23 | INCIDENT | ▪MEDIUM | •ACTIVE | | SHIPPING HALLWAY SHIPPING HALLWAY #23 | 1 HR AGO | MARK ANTHONY |
| ☐○ | FORK TRUCK #141 BATTERY LEAKAGE | INCIDENT | ▪HIGH | •ACTIVE | ⚠YES | SORTING FORK #143 | 2 HR AGO | WILLIM S |
| ☐○ | ESTOP | FAULT | ▪MEDIUM | •ACTIVE | | PICKING CONVEYOR 2405 | 01:48 PM 21 APRIL 2022 | MEL GIBSON |
| ☐○ | WORKER SHORTAGE | ANOMALY | ▪LOW | •ACTIVE | | PACKING CONVEYOR 2405 | 01:00 PM 20 APRIL 2022 | BENJAMIN ALEX |
| ☐○ | FORK TRUCK BATTERY LEAKAGE | INCIDENT | ▪MEDIUM | •CLOSED | ⚠YES | AREA 83643 | 11:30 AM 19 APRIL 2022 | LAUREN |
| ☐○ | OIL SPILL IN MACHINE FLOOR | INCIDENT | ▪MEDIUM | •CLOSED | ⚠YES | AREA 9839 | 10:30 AM 19 APRIL 2022 | CHANDL |

NOTIFICATIONS  ✕ 630

NOTIFICATIONS ① | ALL EVENTS

⚑ INCIDENT   5 MINS AGO
INVENTORY SPILL AT DOCK DOOR 17
SAFETY ISSUE
INVENTORY SPILL FOUND DURING PLANNED INVENTORY CHECK IN THE RECEIVING DOCK.
REPORTED BY: CHARLES WINK
AUTO-TASK CREATED SUCCESSFULLY.

⚑ FAULT  ASSET  30 MINS AGO
SHIPPING LANE FULL
ASSET: CONVEYOR 1216
AREA: PICKING OUTBOUND OPERATIONS
FULL PHOTOEYE IS FLAGGED.
CONVEYOR IS NOT CURRENTLY ACCEPTING NEW PRODUCT.

620  ✕
✓ INCIDENT REPORTED
INVENTORY SPILL AT DOCK DOOR 17

*FIG. 6*

TASK OVERVIEW

TOTAL TASKS 1,234    ACTIVE TASKS 135    TASK SUMMARY [18] IN PROGRESS [4] DELAYED

TASK LIST 710

1-6 of 35 | NO FILTERS APPLIED

| ☐ TASK NAME | PRIORITY → | STATUS → | CATEGORY → | ASSIGNED TO |
|---|---|---|---|---|
| ☐ CYCLE COUNT GROUP A IN PICKMOD4 | MEDIUM | ○ NOT STARTED | CYCLE COUNT | TRACY SMITH |
| ☐ SAFETY CHECK DOCK DOORS | MEDIUM | ○ IN PROGRESS | SAFETY CHECK | GARY WALKER |
| ☐ ASSEMBLE VALUE-ADDS IN ZONE 2 | HIGH | ○ COMPLETED | ASSEMBLE | JOE SMITH |
| ☐ UNLOAD & PUTAWAY INVENTORY FROM DOOR 14 | LOW | ○ ACCEPTED | UNLOAD | JANICE BING |
| ☐ REPLENISH PRINTER MEDIA AT DOOR 2 | LOW | ○ CLOSED | LOADING | TRACY SMITH |
| ☐ LOAD INVENTORY AT DOOR 18 | MEDIUM | ○ IN PROGRESS | LOADING | GARY WALKER |

FIG. 7

| ASSIGNED ON | LAST UPDATED | CREATED BY | ACTIONS |
|---|---|---|---|
| 1 MIN AGO | 1 MIN AGO | SYSTEM | TASK DETAILS ... |
| 2 MINS AGO | 2 MINS AGO | JANICE BING | TASK DETAILS ... |
| 5 MINS AGO | 5 MINS AGO | PHEBE BUFFEY | TASK DETAILS ... |
| 10 MINS AGO | 3 MINS AGO | WALTER WHITE | TASK DETAILS ... |
| 1 HR AGO | 30 MINS AGO | SYSTEM | TASK DETAILS ... |
| 11:30 AM APRIL 17, 2022 | 11:30 AM APRIL 18, 2022 | SYSTEM | TASK DETAILS ... |

AVERAGE RESOLUTION TIME
22 MIN
12% ↘ SINCE LAST WEEK

TASK PRIORITY
▪HIGH 628  ▫MEDIUM 422  ▫LOW 184

🔍 SEARCH TITLE    ⇅ FILTER & SORT ⌄    ⊕ CREATE NEW TASK — 720

NOTIFICATIONS                              ✕

| NOTIFICATIONS ① | ALL EVENTS |

▦ INCIDENT                                    5 MINS AGO
OIL SPILLAGE AT MACHINE FLOOR #141
SAFETY ISSUE
OIL SPILLAGE OCCUR DURING PLANNED INVENTORY CHECK IN THE MACHINE FLOOR.

REPORTED BY: CHARLES WINK
AUTO-TASK CREATED SUCCESSFULLY.

▦ FAULT  ASSET                              30 MINS AGO
SHIPPING LANE FULL
ASSET: CONVEYOR 1216
AREA: PICKING OUTBOUND OPERATIONS

FULL PHOTOEYE IS FLAGGED. CONVEYOR IS NOT CURRENTLY ACCEPTING NEW PRODUCT.

*FIG. 7*
*(CONT.)*

CREATE NEW TASK  900  ✕

910 → TEMPLATE
[ CLEANUP STORAGE AREA AT *[LOCATION]* ▼ ]

920 → TITLE
[ CLEANUP STORAGE AREA IN ZONE 6 ]

CATEGORY
[ CLEANUP ▼ ]

930 → ASSIGNED TO
[ 👤 AMY MCLEAD ✕ ▼ ]

INDIVIDUALS TO BE NOTIFIED - *OPTIONAL*
[ 👤 TIM FROST ✕   👤 SARAH OLSEN ✕ ▼ ]

940 → LOCATION & ASSEST DETAILS

PRIMARY LOCATION - *OPTIONAL*
[ ZONE 6 ▼ ]

DESTINATION LOCATION - *OPTIONAL*
[ SELECT DESTINATION LOCATION ▼ ]

ASSET TYPE - *OPTIONAL*
[ SELECT ASSET TYPE ▼ ]

ASSET - *OPTIONAL*
[ SELECT ASSET ▼ ]

CANCEL                           [ CREATE TASK ]

*FIG. 9*

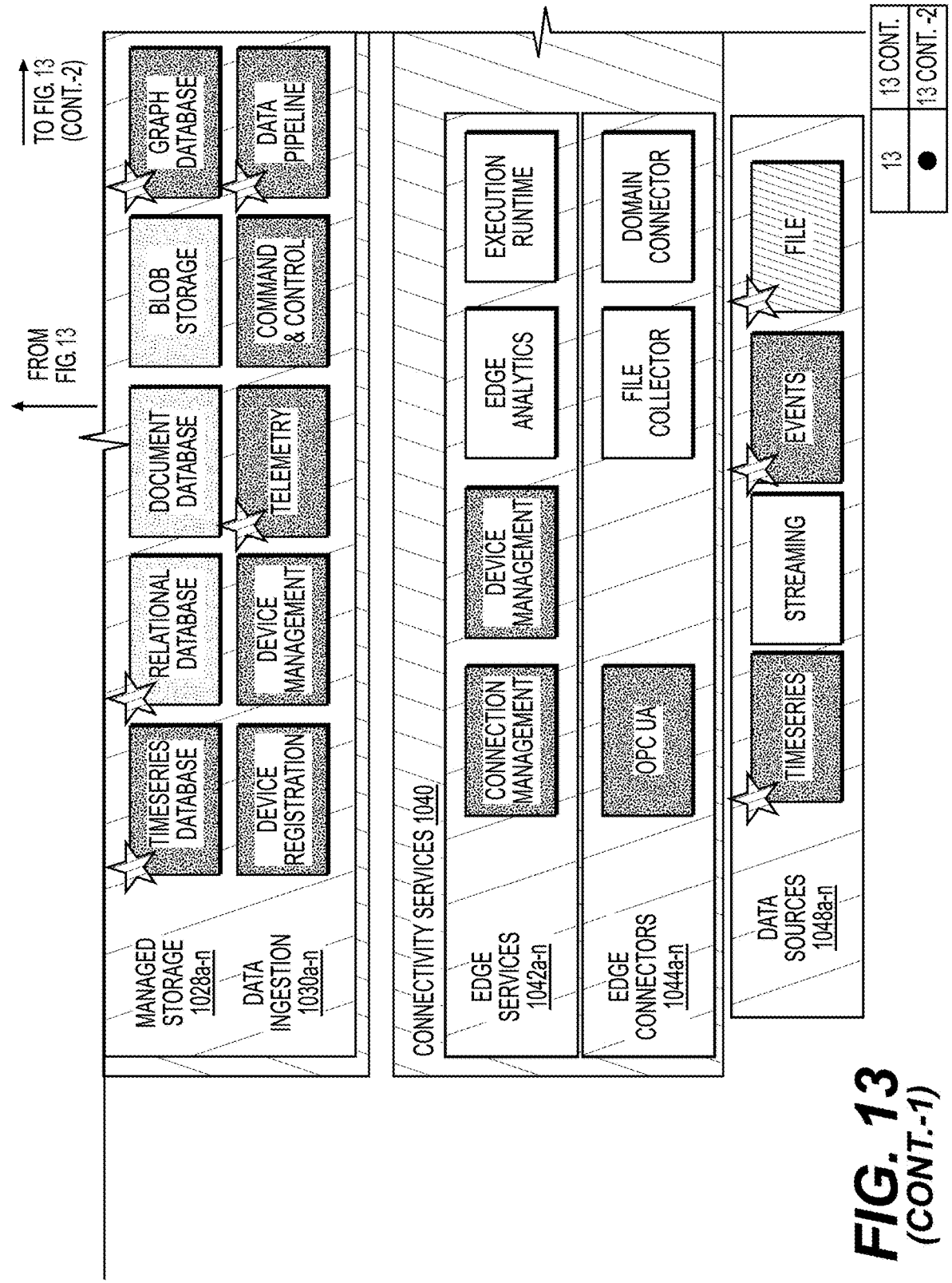
FIG. 13 (CONT.-1)

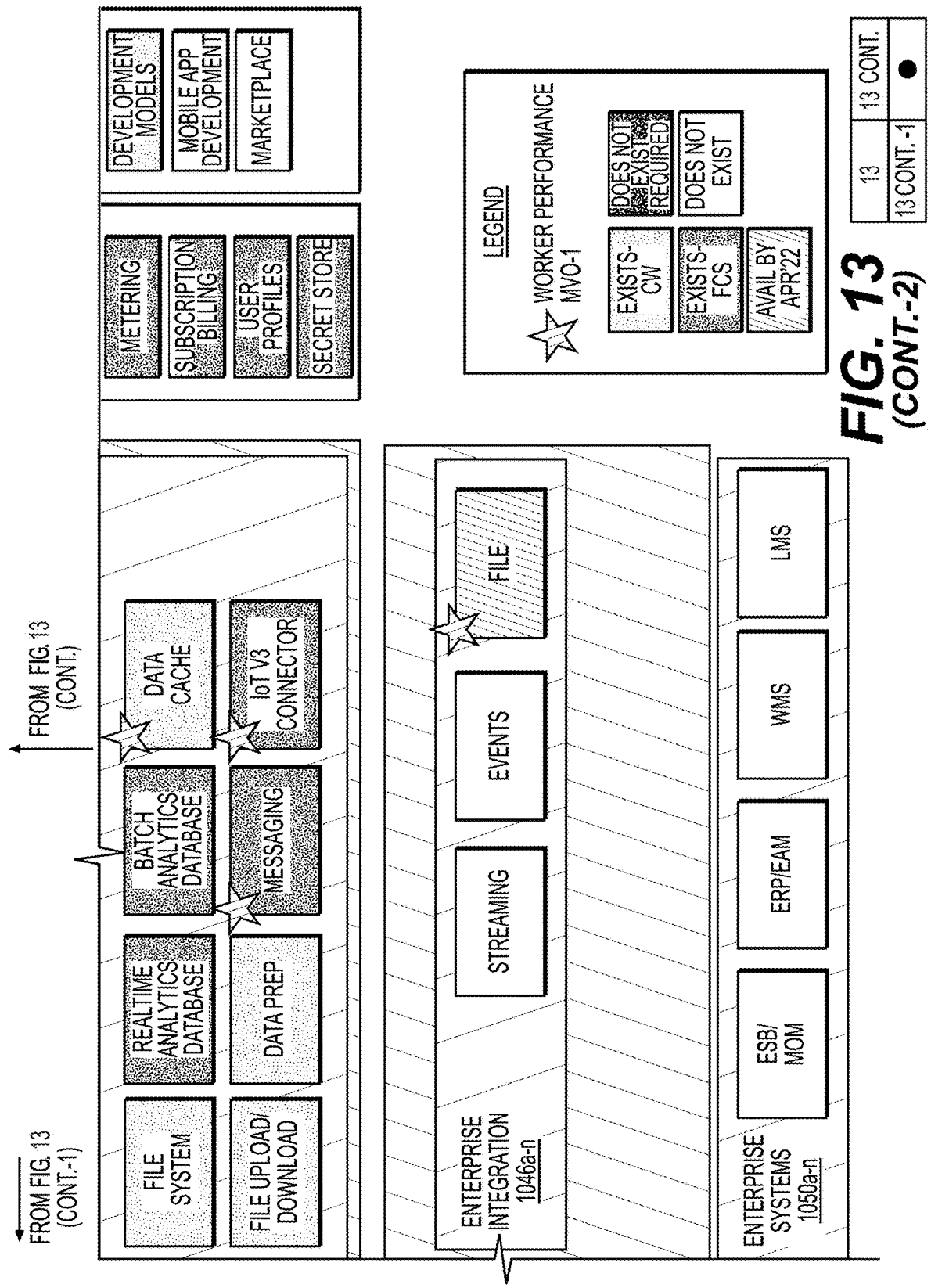

SYSTEM AND METHOD FOR TEMPLATE CREATION, CONFIGURATION, AND IDENTIFICATION

RELATED APPLICATION

This application claims the benefit of priority to U.S. Provisional Patent Application No. 63/377,606, filed Sep. 29, 2022, the entirety of which is hereby incorporated by reference.

TECHNICAL FIELD

The present disclosure relates generally to methods and systems to optimize operations in a workplace such as a warehouse, distribution center, airport ground operations, and retail generally.

BACKGROUND

Material movement, labor allocation, logistics, maintenance, and incident management all require creation of tasks and events to seamlessly manage day to day operations.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

A computer implemented method of creating and organizing tasks for operating a warehouse is disclosed, the method performed, by at least one processor, operations comprising: connecting a gateway device with a data ingestion pipeline, the data ingestion pipeline being in communication with a plurality of worker computing devices and a plurality of sensor devices, the worker computing devices each relating to one or more workers of a plurality of workers; connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules; determining, based on information received from the data ingestion pipeline and the system integration framework, that a worker is requesting a template to generate a task or event; retrieving the template from a memory, the template having information corresponding to the task or the event associated with the connected warehouse; sending the template to the worker computing device associated with the worker requesting the template; sending a prompt to input data into the template on the worker computing device; uploading the data from the template to a dashboard accessible from the plurality of worker computing devices, the data indicating the creation of a new task and/or a new event.

A system for exchanging real-time data in a connected warehouse, comprising: one or more processors; and a non-transitory computer readable medium storing instructions that, when executed by the one or more processors, cause the one or more processors to perform operations comprising: connecting a gateway device with a data ingestion pipeline, the data ingestion pipeline being in communication with a plurality of worker computing devices and a plurality of sensor devices, the worker computing devices each relating to one or more workers of a plurality of workers; connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules; determining, based on information received from the data ingestion pipeline and the system integration framework, that a worker is requesting a template to generate a task or event; retrieving the template from a memory, the template having information corresponding to the task or the event associated with the connected warehouse; sending the template to the worker computing device associated with the worker requesting the template; sending a prompt to input data into the template on the worker computing device; uploading the data from the template to a dashboard accessible from the plurality of worker computing devices, the data indicating the creation of a new task and/or a new event.

Further discloses is a non-transitory computer readable medium storing instructions that, when executed by one or more processors, cause the one or more processors to perform a method of operating a connected warehouse comprising: connecting a gateway device with a data ingestion pipeline, the data ingestion pipeline being in communication with a plurality of worker computing devices and a plurality of sensor devices, the worker computing devices each relating to one or more workers of a plurality of workers; connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules; determining, based on information received from the data ingestion pipeline and the system integration framework, that a worker is requesting a template to generate a task or event; retrieving the template from a memory, the template having information corresponding to the task or the event associated with the connected warehouse; sending the template to the worker computing device associated with the worker requesting the template; sending a prompt to input data into the template on the worker computing device; uploading the data from the template to a dashboard accessible from the plurality of worker computing devices, the data indicating the creation of a new task and/or a new event.

To the accomplishment of the foregoing and related ends, certain illustrative aspects are described herein in connection with the following description and the appended drawings, including the appendix attached to this disclosure including other examples of the herein disclosed solution and which is incorporated by reference in its entirety as if set forth verbatim here. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 6 is an example user interface of an events overview dashboard.

FIG. 7 is an example user interface of a task overview dashboard.

FIG. 9 depicts an exemplary embodiment of a task template.

DETAILED DESCRIPTION

Figure 1:
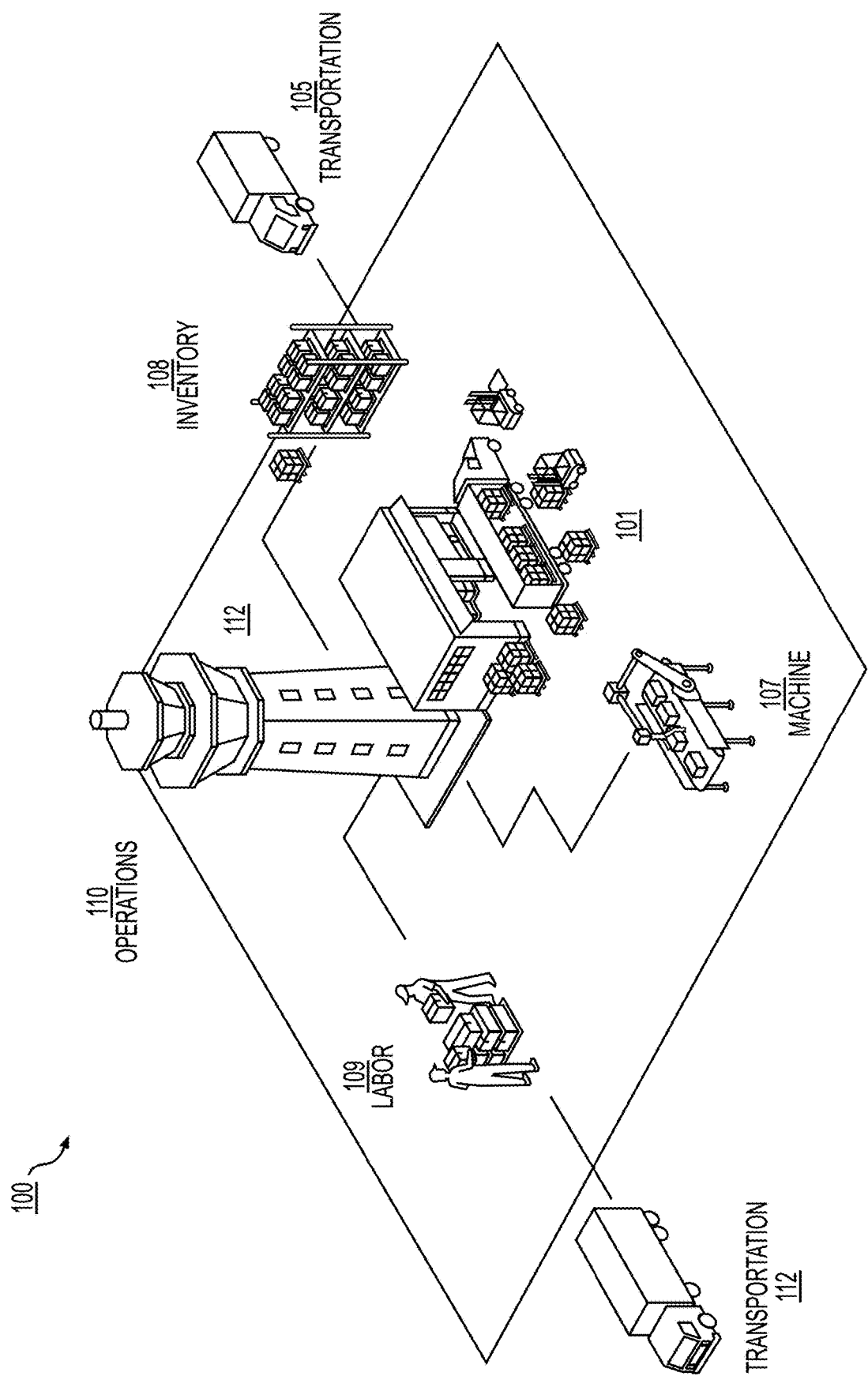
FIG. 1 is a schematic diagram illustrating an example environment implementing methods and systems of this disclosure.

The following embodiments describe systems and methods for facilitating a connected warehouse as between employees, managers, and other users. In particular, the following embodiments are directed to systems and methods for A dynamic and decentralized technique for implementing a connected warehouse system is provided. An embodiment or implementation described herein as "dynamic" is intended to reflect or indicate that the embodiment(s) is or can be marked by continuous and productive activity or change, though not necessarily constantly changing. The system and corresponding techniques facilitate communications within one or more warehouses, between users (e.g., worker, teams of workers, manager, etc.), and between warehouses, third parties associated therewith, and data centers. Such communications may be facilitated by edge systems and gateway systems. The edge and gateway systems may be located in warehouses (i.e., on-site) as embedded or fixed systems and/or other user devices such as tablet PCs and mobile phones (e.g., devices controlled by or in communication with an operations manager, etc). Each edge system may be coupled to a warehouse system from which warehouse operations data may be collected, and in communication with other edge systems and gateway systems. Each gateway system may be in communication with warehouse operation systems and edge systems of the warehouse in which the gateway system is resident (e.g., with the operations manager), and may also be in communication with gateway systems located in other warehouses, all or some of which may provide data to the gateway system. By facilitating communication with gateway systems located in other warehouses, the gateway system may enable exchange of data among edge systems installed in different warehouses. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in warehouses. Therefore, software may be installed on the corresponding warehouse hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to warehouse systems in the warehouse or other warehouses, gateway systems in the warehouse or other warehouses, decentralized system(s) such as cloud computing center(s), and centralized system(s) such as dedicated server farms. The decentralized system(s) and centralized system(s) may be owned by the operators of the warehouses, or by a third party such as a government or a commercial entity.

Each edge system in a warehouse may be coupled to a sensor of a corresponding warehouse system in the same warehouse, enabling data captured by the sensor to be provided directly to the edge system. Also, a gateway system in a warehouse may be coupled to one or more sensors of warehouse systems in the same warehouse, enabling data captured by the one or more sensors to be provided directly to the gateway system. In another embodiment, each edge system in a warehouse may be coupled to warehouse system of a corresponding warehouse system in the same warehouse. Also, a gateway system in a warehouse may be coupled to warehouse system machines of warehouse systems in the same warehouse. In some aspects, warehouse system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the warehouse system may not be implemented, or may not be coupled to the one or more sensors of the warehouse system. If the warehouse system machine is not implemented or not coupled to the one or more sensors, data captured by the one or more sensors may be provided directly to the one or more connected edge systems and/or gateway system.

Each warehouse system may be in communication with, through an edge system or not, a gateway system. Edge systems in a warehouse may be in direct communication with one another. For example, any data retained by one edge system may be transmitted directly to another edge system within the same warehouse, without a gateway system acting as an intermediary. In another embodiment, an edge system may send to or receive data from another edge system located in the same warehouse through a gateway system. The communication between the edge systems and the communication between the edge systems and the gateway system may be through a wired or wireless connection.

A gateway system of a warehouse may be in communication with gateway systems of other warehouses. Through this communication path, an edge system or a gateway system of a warehouse may transmit data to and obtain data from edge systems or gateway systems of other warehouses. The communication path between gateway systems of different warehouses may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a warehouse may communicate with another edge system in a different warehouse via gateway systems of the respective warehouses. For example, an edge system in a warehouse may transmit data to one or more edge systems in other warehouses via the gateway systems of the respective warehouses communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, warehouse operations centers, remote systems):

Filter and analyze real-time and stored data collected from other edge systems, warehouse systems, gateway systems, and/or operations center(s), and generate events based on the analysis;

Identify dynamic (i.e., as needed) and static (i.e., all the time) data transmission targets (e.g., edge systems within the same warehouse, edge systems in other warehouses, operations center(s));

Transmit data over an Internet connection to the operations centers;

Provide a request/response interface for other edge/gateway systems, warehouse borne computer systems, operations centers, and remote systems connected over wired/wireless networks or Internet to query the stored data and to dynamically select/change data filters;

Use request/response interfaces provided by other edge systems, gateway systems, and operations centers connected over wired/wireless networks or Internet to obtain data and to dynamically select/change data filters;

Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same warehouse, edge systems in other warehouses, gateway system in the same warehouse, gateway systems in other warehouses, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a warehouse may also be in communication with one or more operations centers, which may be located remotely from the warehouse (i.e., off-site). In some embodiments, however, the operations center(s) may be located on-site at the warehouse. Each of the warehouse systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

FIG. 1 illustrates an exemplary warehouse and/or distribution center environment 100 with certain components, including delivery transportation 105 (e.g., supply chain delivery truck) to load into inventory 108. An operational control tower 112 may monitor and/or otherwise control operations 110 within environment 100. Operations 110 can be performed and/or managed by labor 109. Operations 110 can include loading 101 and assembly machines 107. Once assembled, packaged, and otherwise processed for distribution, transportation 116 (e.g., a freight truck) can be loaded by labor 109 and depart for its subsequent destination. The environment 100 is configured to optimize worker performance by selectively scheduling and assigning tasks and worker equipment, as discussed more particularly below. The term "worker" can be understood as a human, a non-human animal (e.g., a trained animal such as a dog) or any other asset that performs tasks at a job site (e.g., a robotic device).

Figure 2A:
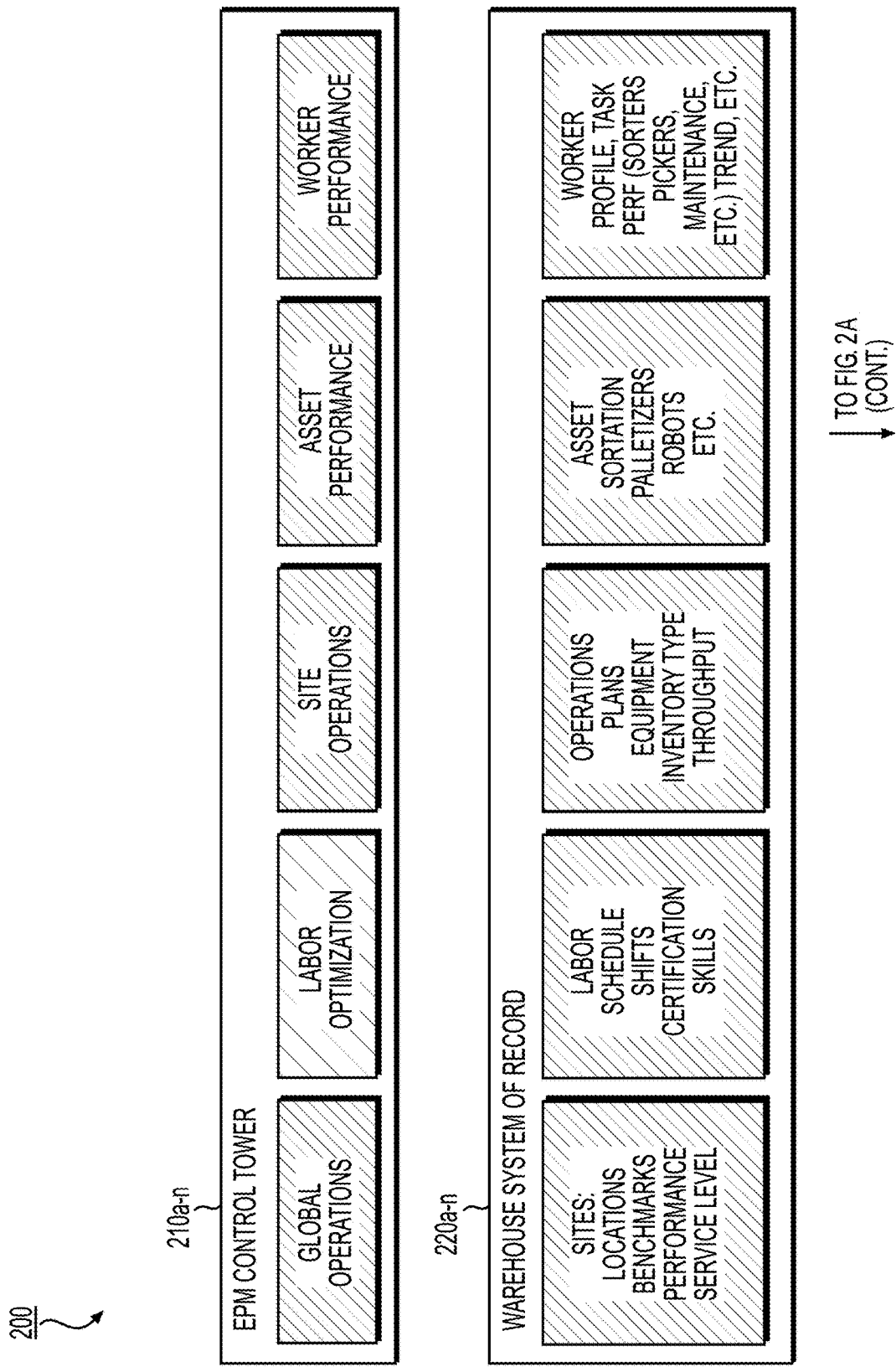
FIG. 2A is a diagram of architecture of a connected warehouse system of this disclosure.
Figure 2A:
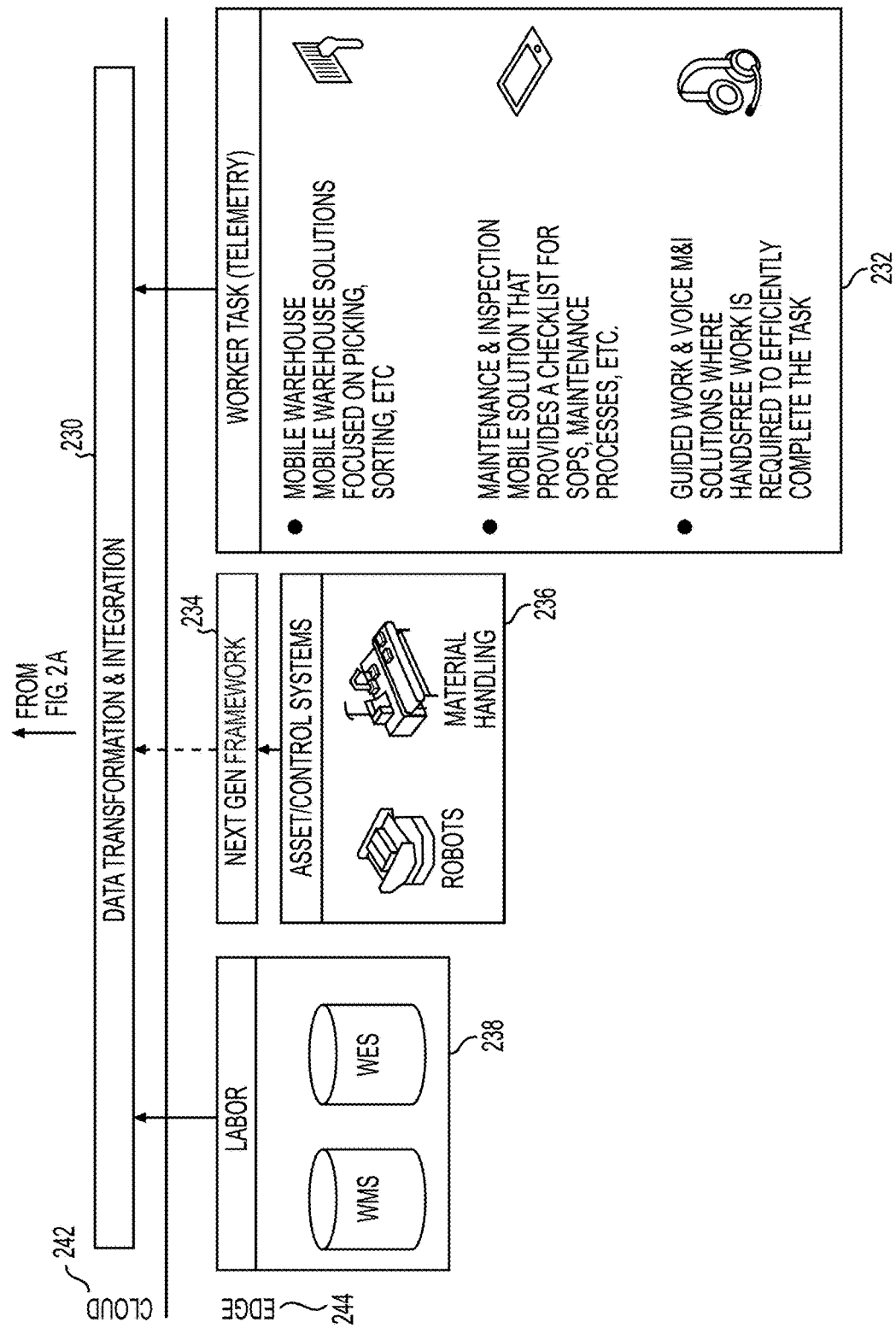

FIG. 2A is a diagram of architecture associated with of a connected warehouse system 200 of this disclosure. System 200 can include enterprise performance management (EPM) control tower 210a-n, including components and databases such as but not limited to global operations, labor optimization, site operations, asset performance, and worker performance. System 200 can also include a networked warehouse system of record 220a-n, including components and databases such as but not limited to sites (e.g., locations, benchmarks, performance service level, etc.), labor (e.g., schedule, shifts, certification, skills, etc.), operations (e.g., plans, equipment, inventory type, throughput, etc.), assets (e.g., sortation, palletizers, robots, etc.), and workers (e.g., trends, profiles, task performance such as sorters, pickers, maintenance works, etc.). EPM control tower 210a-n and networked warehouse system of record 220a-n can reside in a cloud based computing system 242 (e.g., a cloud computing network, one or more remote servers) and be communicatively coupled to data transformation and integration layer 230.

System 242 may be communicatively coupled to an edge computing system 244. System 244 can be an edge computing system or node with a dedicated unit onsite at the work site (e.g., factory, distribution center, warehouse, etc.). System 244 can be configured to process data and information from labor database 238, asset control systems 236 (e.g., components related to control of robots, material handling, etc.) and worker tasks database 232. Database 238 can include databases for warehouse management services (WMS) and warehouse execution systems (WES).

Database 232 can include one or more telemetry components operatively coupled to features of distribution center environment 100 so as to process and transmit control information generated subscribing to incoming control information for consumption by one or more controllers of system 240 over a network. Database 232 can be configured for data validation and modification for incoming telemetry or attributes before saving to the database; copy telemetry or attributes from devices to related assets so you can aggregate telemetry, e.g., data from multiple subsystems can be aggregated in related asset; create/update/clear alarms based on defined conditions; trigger actions based on edge life-cycle events, e.g., create alerts if device is online/offline; load additional data required for processing, e.g., load threshold value for a device that is defined in a user, device, and/or employee attribute; raise alarms/alerts when complex event occurs and use attributes of other entities inside email template; and/or consider user preferences during event processing. In some aspects, messages transmitted from database 232, such as triggers and/or alerts, can be configured for transmitting information to an end user (e.g., site lead, crew in the control tower, etc.) for optimization purposes. System 200 can also be configured to detect near accidents or other misses to build a trend model for early detection of anomalies before faults or malfunctions occur increasing safety. In some aspects, the trend model can perform statistical analysis of worker trends including assigned tasks, event datasets to derive insights on worker performance considering the nature of work, skillset, criticality, labor intensity, etc. In some aspects, the trend model can classify data on a variety of key performance parameters to generate reports, dashboards, and insights that can be presented to users. In some aspects, the trend model can determine benchmarks based on statistics for type of task, skill set, geographical location, industry etc. to enable performance-based assessment, incentives and target setting for worker operations.

Database 232 can include mobile warehouse solutions focused on picking, sorting, and other such tasks. Database 232 can include maintenance and inspection components configured to provide one or more checklists with standard operating procedures (SOPs), maintenance processes, and the like. Database 232 can include guided work and voice maintenance and inspection components configured where hands-free work is required by employees to complete a task.

Figure 2B:
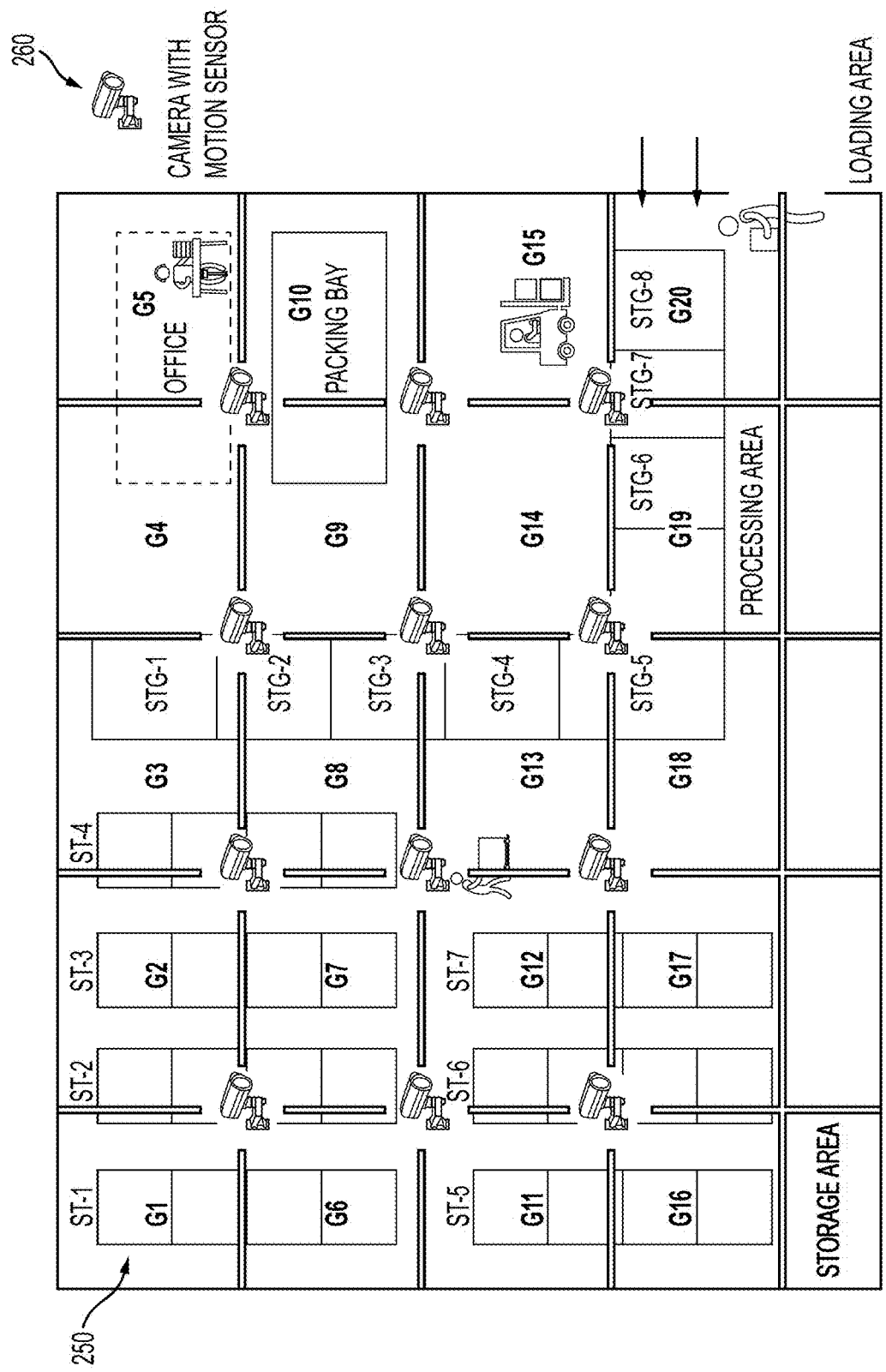
FIG. 2B is a diagram of a layout of a warehouse with the connected warehouse system of this disclosure.

FIG. 2B is a diagram of layout of a warehouse with the connected warehouse system described in FIG. 2A. The warehouse includes a job site 250 that may comprise, for example, a storage area, a processing area, a loading area, a packing bay, and an office. Workers are generally situated in the storage area, the processing area, the loading area, or the packing bay, depending on their assigned tasks. The warehouse system 200 described in FIG. 2A may be used to monitor the warehouse using a variety of sources including voice input, scanning, device usage, network activity, location-based events, visual recognition events. The input from these sources may be used to determine the occurrence of an event or disruption and to prompt a user for creation of an incident or task from a template creation system.

The system 200 employs a plurality of methods to track the real-time progress of the tasks. The system interfaces with external systems to track the engagement levels of the workers on a real-time basis at any given time. This includes tracking specific task scheduled start times, the progress of the task after it has commenced, and a completion of the task. The warehouse layout may be equipped with motion sensor cameras 260 at strategic locations to monitor the movement of workers and materials in the warehouse. Each task is broken down to various stages and each stage associated with desirable time for completion. The time duration of each stage would be based on historic performance of workers, distance or level of effort involved and company or regulatory practices or policies. The motion sensing camera's capture the worker and material movement and automatically compute the status of the task based on the position of the worker and the materials. The worker may also be provided with voice or PED based application that tracks and collects information directly from the worker on the progress made.

Because the system 200 also interfaces with external systems for real-time tracking of other events, anomalies or failures in the business environment which potentially impact the productivity of the worker, the system 200 may include an algorithm to identify idle or unproductive workers and compare to events or disruptions that may have had an impact their tasks. If there is no event identified that may explain a worker's idleness, a communication may be triggered to the worker to identify whether there has been a localized or personal incident, such as a medical event or fatigue, and provide the worker with access to the template store to create a record of the incident or event.

Figure 3:
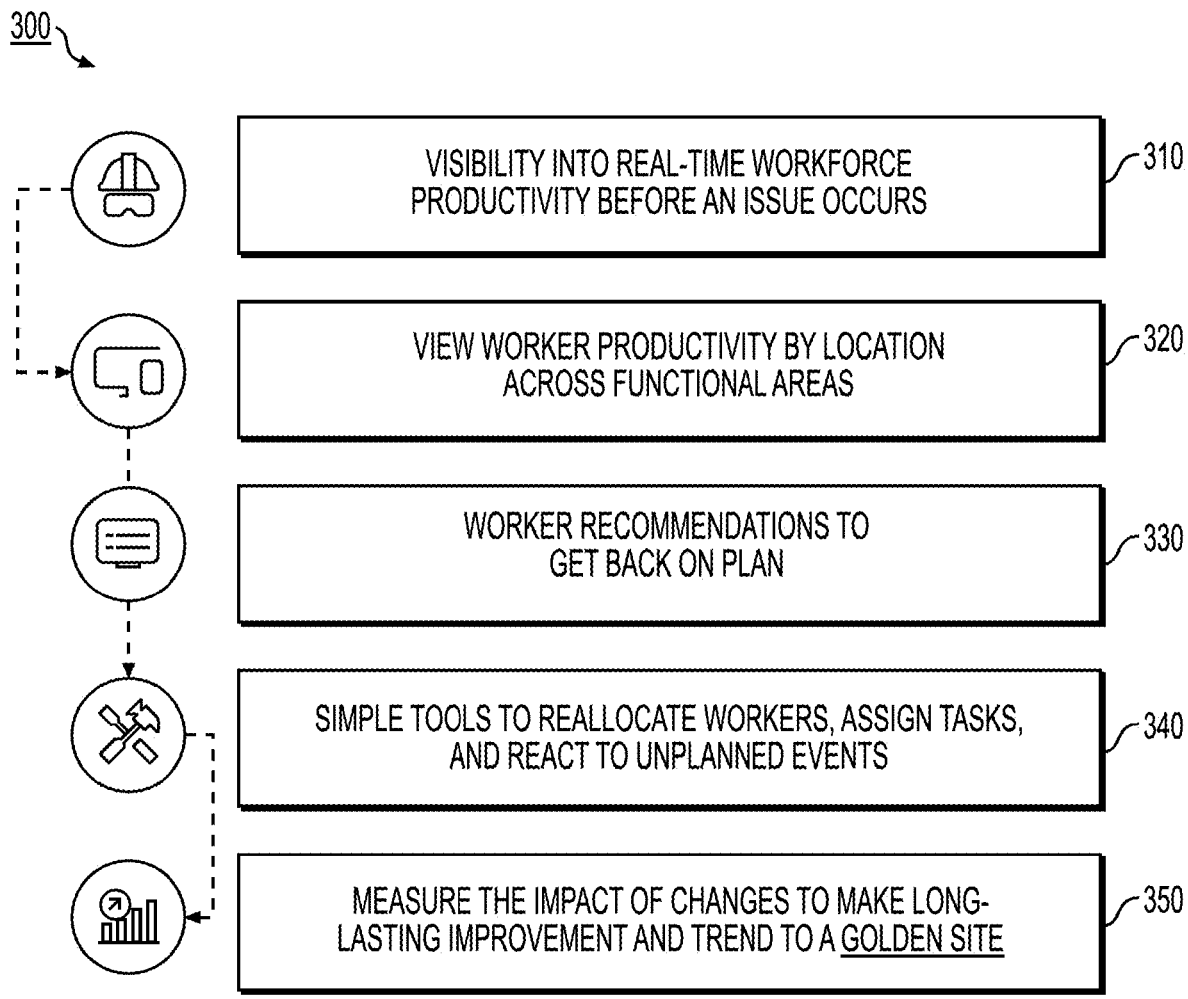
FIG. 3 is a flowchart illustrating a method for optimizing operations of a job site.

FIG. 3 is a flowchart illustrating a method 300 for optimizing operations of a job site. In step 310, the method can include providing visibility into real-time workforce productivity before an issue occurs. In step 320, the method can include viewing worker productivity by location across functional areas. In step 330, the method can include providing worker recommendations to return to a worker plan. In step 340, the method can include providing tools to reallocate workers, assignment tasks, react to unplanned events or disturbances in an event resolution or disruption mitigation plan. In step 350, the method can include measuring the impact of changes to make persistent improvement via a learning model and event or disturbance log and trend to an optimized job site (e.g., a golden site).

Figure 4:
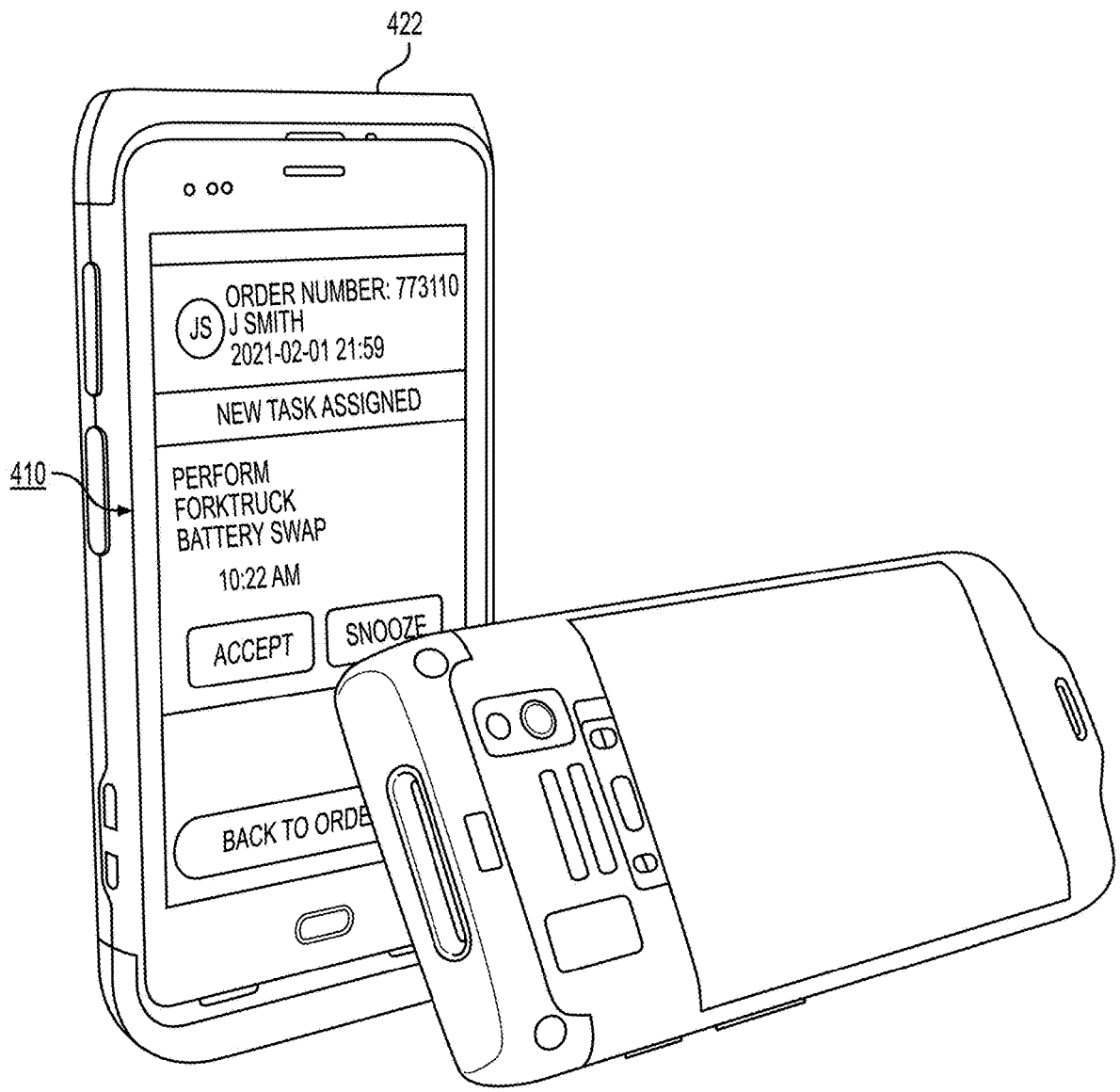
FIG. 4 depicts an example user interface dashboard in a first mode, according to an exemplary embodiment.

FIG. 4 depicts an example user interface 410 for of an example computing device 422. As seen, via user interface 410 one or more tasks can be assigned, created, and/or otherwise communicated to one or more users (e.g., crew member). Such notifications related to a newly assigned task or feedback related to an already-assigned task can include information controls for users to accept, snooze, and/or otherwise interact with a respective task (e.g., propose or execute modifications to a task, work plan, and/or the like). Specifically, user interface 410 can be used to generate real-time task instructions for employees (e.g., crew members) or any related user based on operations feedback, including human and analytics feedback related to one or more work sites. As can be seen, interface 410 can include automatically and/or manually generating tasks with task-related information, such as a template(s) for task creation, a work site location (e.g., zone, 1, zone 2, etc.), a worker pulldown menu (e.g., team 1, team 2, individual 1, individual 2, etc.), and a priority pulldown menu (e.g., move to top, objective categorizing of a task such as urgent, non-urgent, etc.). In some aspects, user interface 410 can be used to oversee worker execution of a work-related plan (e.g., daily plan, a weekly plan, a monthly plan, a quarterly plan, etc.) so as to encourage and remain present to advise and address issues that prevent employees from completing tasks. In some aspects, user interface 410 is used to optimize workplace performance by automatically assigning and/or scheduling the appropriate tasks for the appropriate employee at the appropriate time (e.g., based on one or more relationships determined as between detected criteria such as employee skills, availability, experience, history, and/or the like). In other aspects, the user interface 410 may be used to optimize workplace performance by automatically providing access to templates for reporting incidents and/or creating tasks in real-time.

Figure 5:
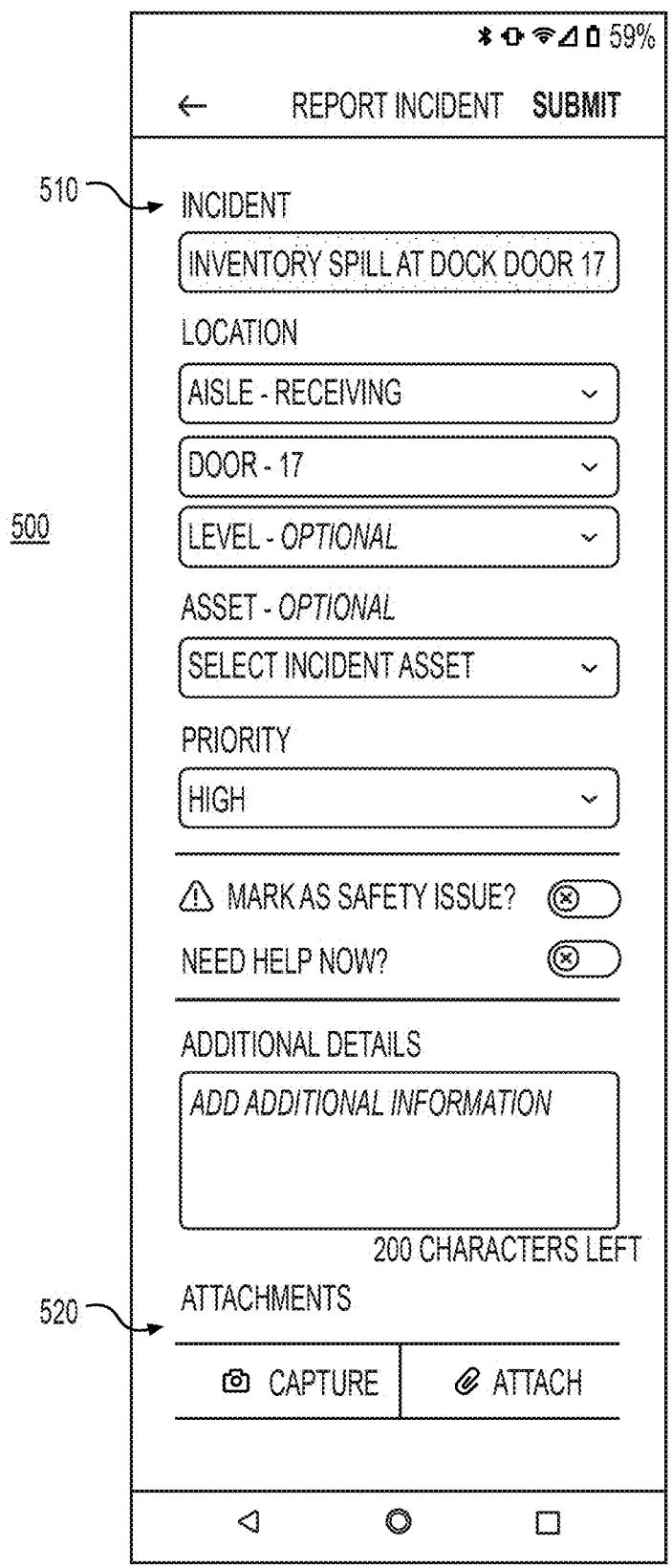
FIG. 5 depicts an example user interface of an incident template.

In one example, a user may report an incident using a template, and create tasks to resolve the incident using other templates, with each incident and task added to a dashboard for notification of related parties and supervisors. As shown in FIG. 5, a worker may access a template 500 on their user device to report an incident, for example an inventory spill at dock door 17. The template may be accessed by an input of a video or photo, by voice input, text input, audio input, or any other media input. This allows for workers who may be wearing cumbersome protective gear or otherwise do not have free access to their user device to input text to input other media instead or to use voice commands. For example, in response to the voice command "inventory spill at dock door 17," the template 500 may be generated on the user interface 510 of the user device, with the information for the incident, location, and priority auto-filled based on the voice command. There are also options to mark for assets affected by the incident, indicators for safety and requirements for assistance, and input fields 520 for additional details and attachments, which may be photos, videos, documents, or any number of file types.

The user also has the option of creating an incident report manually, with a blank template appearing on the user interface 510, and a text input field appearing on the user interface 510 to manually enter the information. When a user enters "inventory spill," the template may recognize "inventory spill" as a type of incident and retrieve a template for that event from a template store that will be described in more detail below. The template then generates the fields associated with an inventory spill and provides menus where appropriate, such as for locations, assets affected, and priority level, and text-based fields for fields such as additional details. Alternatively, the template may provide a drop down list of options for common incidents or events for the user to choose from when creating an incident. In either event, after the template is completed and the user submits the incident report, the incident is added to a dashboard of events or incidents to be communicated to all other affected workers.

FIG. 6 is an example of an events overview dashboard 600, which includes an event log 610 of most recent events with information about each event, such as their priority level, their status (active versus closed), whether the event creates a safety hazard, the impacted areas, and the reporting time and worker. A pop-up 620 appears on the dashboard 600 that indicates that a new incident has been reported, in this example in response to the completed template from FIG. 5. On a sidebar 630, further details are provided about the incidents. The dashboard 600 may also include an icon that, when selected, allows the user to create a new task or incident and directs them to a template.

In FIG. 7, a task overview dashboard 700 is shown that is similar to the event overview dashboard 600 but instead includes a task list 710 for a defined period, typically a workday or work shift. The task list includes information about tasks to be completed, such as the task name, priority, status, category, assignment information, and update information. Notifications related to a newly assigned task may include information controls for users to accept, snooze, and/or otherwise interact with a respective task (e.g., propose or execute modifications to a task, work plan, and/or the like). Specifically, a user interface can be used to generate real-time task instructions for employees (e.g., crew members) or any related user based on operations feedback, including human and analytics feedback related to one or more work sites. As can be seen, interface can include automatically and/or manually generating tasks with task-related information, such as a template(s) for task creation, a work site location (e.g., zone, 1, zone 2, etc.), a worker pulldown menu (e.g., team 1, team 2, individual 1, individual 2, etc.), and a priority pulldown menu (e.g., move to top, objective categorizing of a task such as urgent, non-urgent, etc.).

Figure 8:
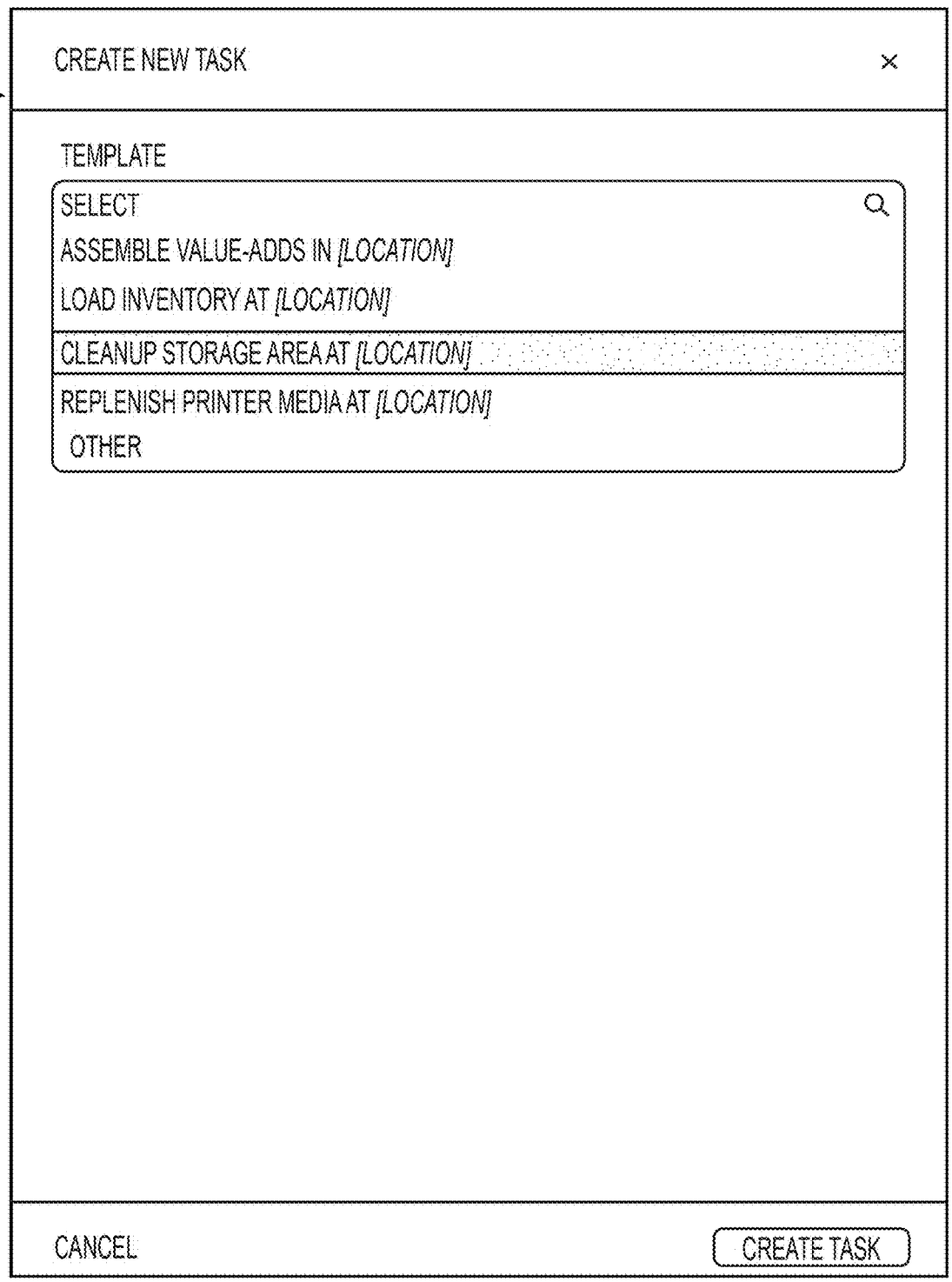
FIG. 8 depicts an exemplary embodiment of a task template creation.

If a new task is required for the day, a user may select an icon or button 720 to create a new task, which will open a template menu 810 for creating a new task on the user's interface, as shown in FIG. 8. The template menu 810 includes pre-defined templates already created and available from the template store 1040, and an option for "other" that allows the user to create a new task for which a template does not exist. If the user selects "other," the task is created without a template in this instance, but the template store may be used to store the information from the new task to create a template for future use. If the user selects one of the pre-defined templates shown in FIG. 8, the user is then directed to the template 900 as shown in FIG. 9.

The template 900 for creating a new task, as shown in FIG. 9, is similar to the template for creating a new incident report. Once a template type 910 is chosen from the drop down menu (in this example, the template for the "cleanup storage area" type of task), the template appears with the appropriate fields for task creation. In field 920, the title of the task is completed with the location filled in. Because the template type was selected as "cleanup storage area," the portion of the title for cleanup storage area at is auto-filled and the user completes the title with the area required. In this instance, the user may either manually type in "Zone 6," the zones may be available from a drop-down menu, or geo-location may be used to determine the location of the user at the time of template creation, with the user having the option to override if the location is incorrect. Furthermore, the template may include a category field to accurately store the task in the task database and make it more easily searchable to interested parties in the task list dashboard. In field 930, the user has the option to assign the task to a specific worker or workers. In one embodiment, the field may be auto-filled with a worker identified by the system as possessing the skillset required for the task, and optionally also with availability in their schedule to fulfill the task. Alternatively, the user may select a worker from a drop down menu or manually enter the name of a worker. The field for individuals to be notified may include the supervisor of the assigned worker, a supervisor for the affected area, and/or workers in the affected area. These individuals likewise may be auto-filled based on the system's knowledge of the affected individuals, or manually entered by the user. In fields 940, the user may likewise provide any information relevant to the affected users or the operation, such as location and asset details. When the template is filled out completely, the user may select an icon or button to create the task after which it is added to the task list dashboard and notifications are sent to the identified individuals.

Figure 10:
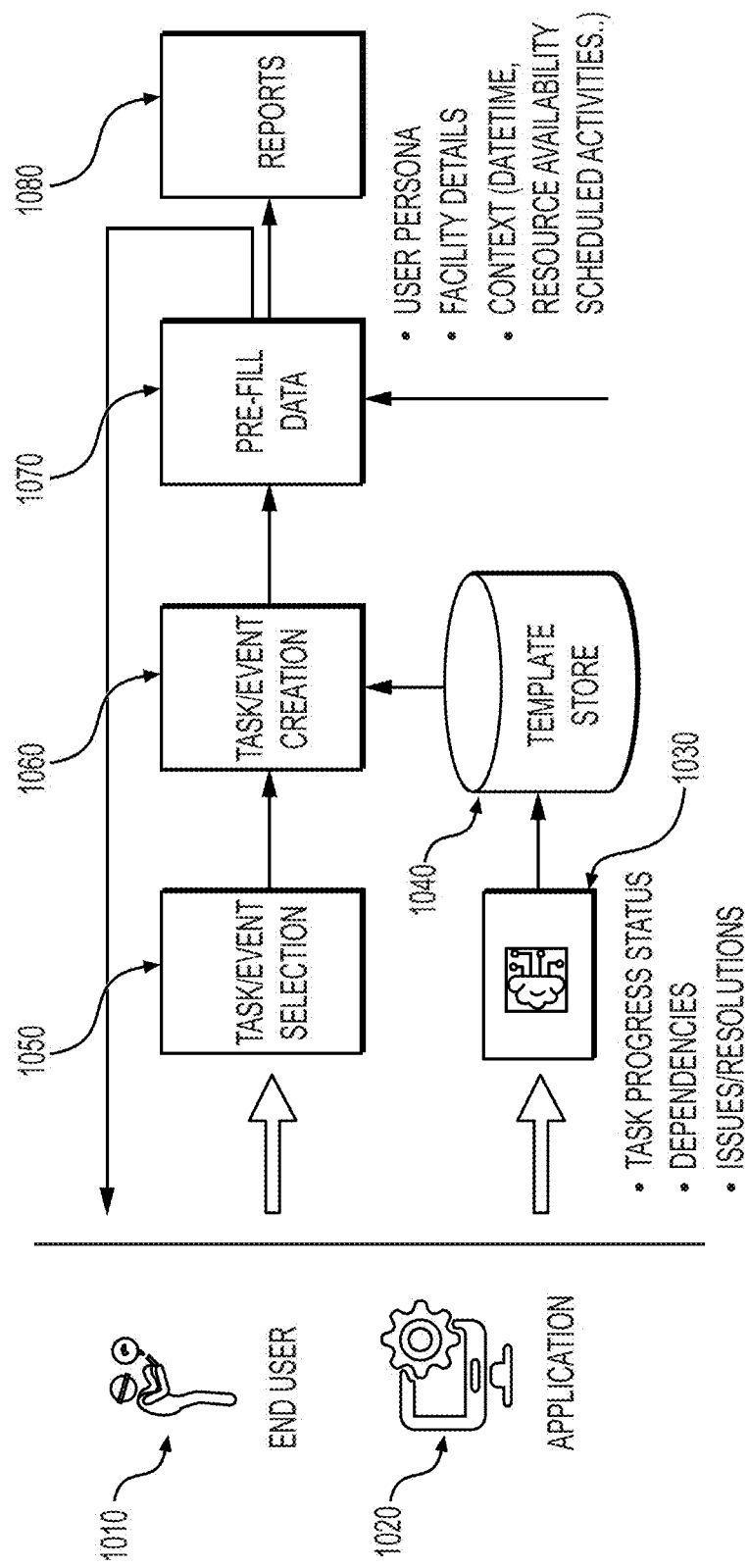
FIG. 10 depicts a flow diagram of a template creation system.

FIG. 10 provides a diagrammatic overview of the process of task/event creation via a template described in FIGS. 4-9. An end user 1010 creates a task or incident/event by navigating to task/event selection window 1050 on the user interface of their device running a connected worker performance application 1020, and is directed to a task/event creation template 1060 based on the task or event selected at step 1050. The template for the task or event creation is retrieved from a template store 1040, which is a database of previously created and used templates, and includes information gleaned from an analysis system 1030 regarding task progress statuses, dependencies of tasks and events, and issues and resolutions previously encountered by the application 1020. Also from the information is provided pre-fill data at step 1070 from the system 1030, the pre-fill data including information about personnel, facility details, and contextual markers of the task or event (such as date and time, resource availability, labor availability, and other scheduled activities). The user enters any additional data not included in the pre-fill data 1070, and submits the completed template for task or event creation to the appropriate reports dashboard at 1080.

Figure 11:
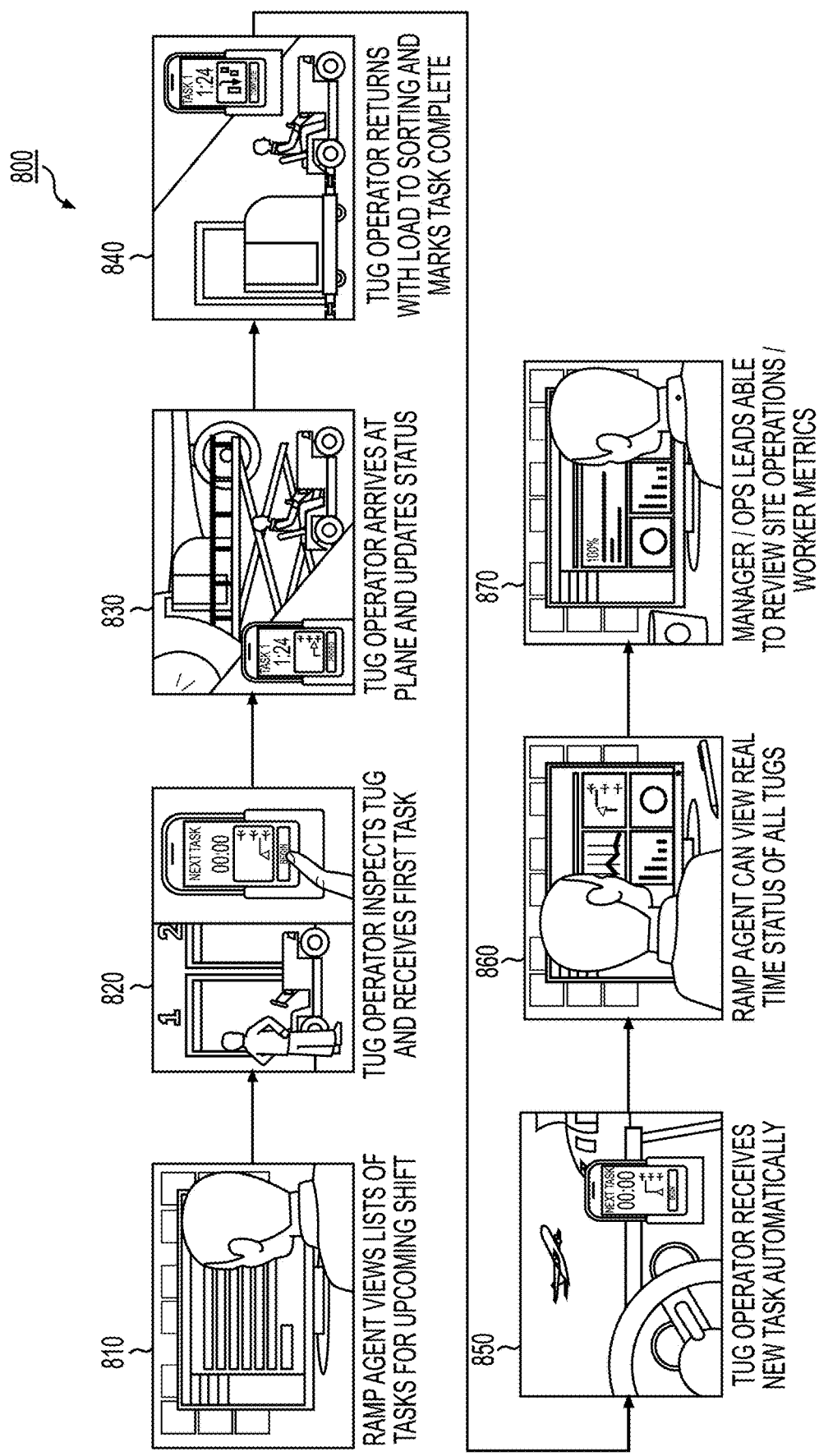
FIG. 11 is a flowchart illustrating a method for managing unplanned tasks, according to an exemplary embodiment.

FIG. 11 is a flowchart illustrating a method 1100 for managing unplanned tasks that may be added via a task creation template (e.g., tasks of job site(s), area(s) of job site(s), employee(s), group(s) of employees, etc.). In step 1110, the method can include viewing, by employee user (e.g., a ramp agent) a list of tasks for a shift (e.g., an upcoming shift). In step 1120, the method can include presenting an assigned first task to the user, the assigned task being unexpected (e.g., a tug operator employee can be inspecting a tug and then receive a first task). In step 1130, the method can include the employee completing a first subtask (e.g., arriving to a job site associated with the assigned task) and updating status of the assigned task based on a status of the first subtask (e.g., the employee has arrived to the job site). In some aspects, the tug operator employee can arrive to an airplane (e.g., the job site) and the status of the first subtask can be that the tug operator employee has arrived to the airplane. The status can be automatically updated and/or communicated based on information the employee detected or tracked from the computing device of the employee (e.g., GPS data automatically transmitted from a location tracker of the computing device of the employee). In some aspects, the status can be manually updated and/or communicated (e.g., the employee can manually enter into a computing device that she has arrived to the job site).

In step 1140, the method can include the employee completing a second subtask (e.g., arriving to a second job site associated with the assigned task) and updating status of the assigned task based on a status of the second subtask (e.g., the employee has arrived to the second job site to sort). In some aspects, the tug operator employ can return with a load from the first job site and the status of the second subtask can be that the tug operator employee has returned from the airplane with the load for sorting or that that the load has already been sorted. The status of the second subtask can be automatically updated and/or communicated based on data of the computing device of the employee and/or any items associated with the second subtask (e.g., GPS data automatically transmitted from the computing device of the employee, tracking information of any items associated with the second subtask, etc.). In some aspects, the status can be manually updated and/or communicated (e.g., the employee can manually enter into a computing device that she has returned, that the load has been sorted, etc.). In some aspects, task updates can be semi-automated and/or automated based on input from one or more feedback mechanisms such as voice input, scanning, device usage, network activity, location-based events, visual recognition events, etc.

In some aspects, completion of the first and second subtasks can automatically mark the assigned task as being completed. In this respect, in step 1150, the method can include upon completion of the first assigned task, automatically assigning a second assigned task to the employee (e.g., the tug operator employee receives a new task since the aforementioned load has been retrieved from the airplane, sorted, and returned).

In step 1160, the method can include viewing, by a second employee (e.g., an employee other than the tug operator such as a ramp agent), a real-time status of all other employees of a team associated with the first employee (e.g., other tug operators of the first tug operator's team).

In step 1170, the method can include reviewing, by a third employee (e.g., an employee who is a manager or OPS lead other than the tug operators), a real-time status of all task operations of the job site and employee task performance metrics.

Figure 12:
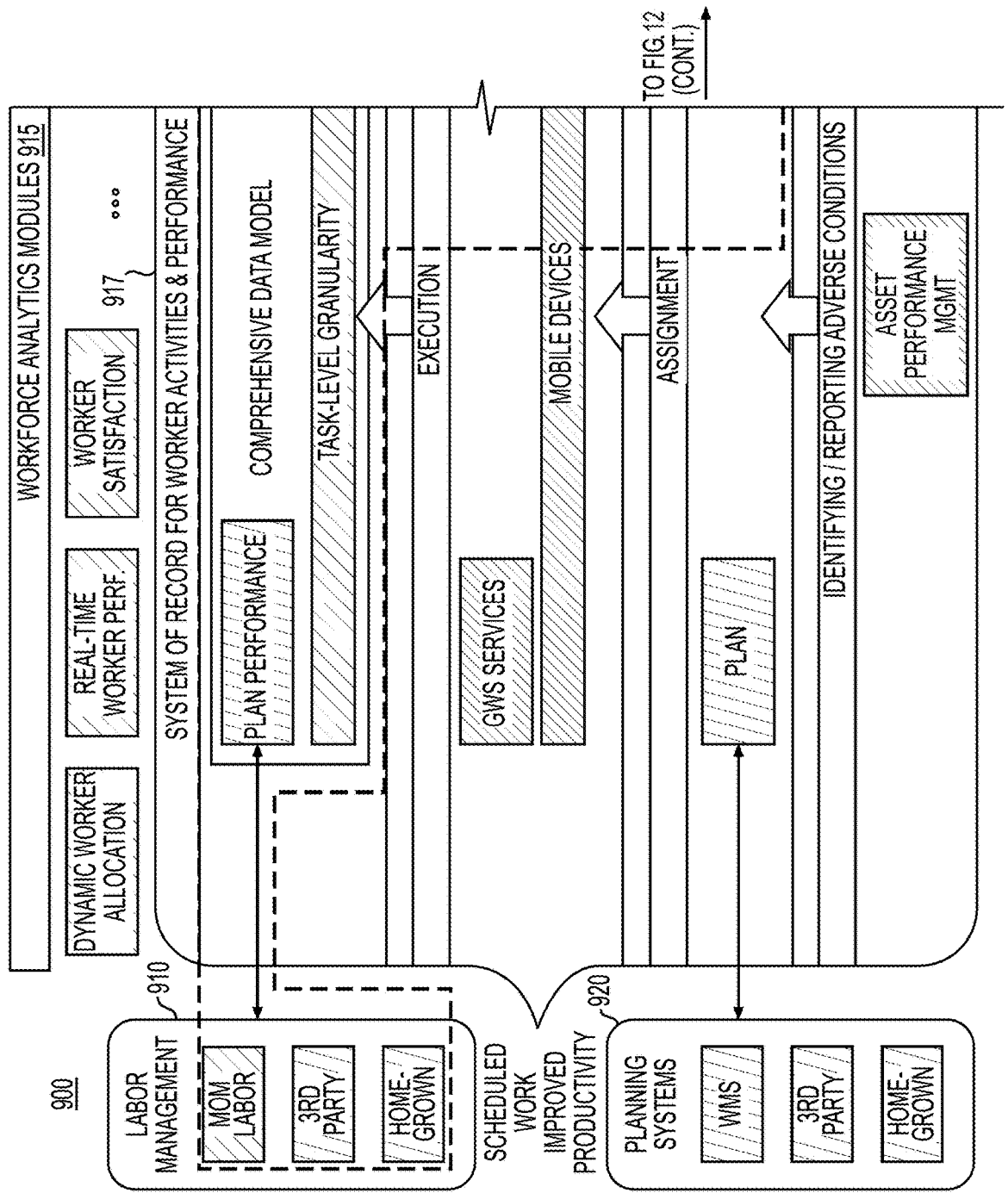
FIG. 12 is a diagram of architecture of a connected warehouse system of this disclosure.
Figure 12:
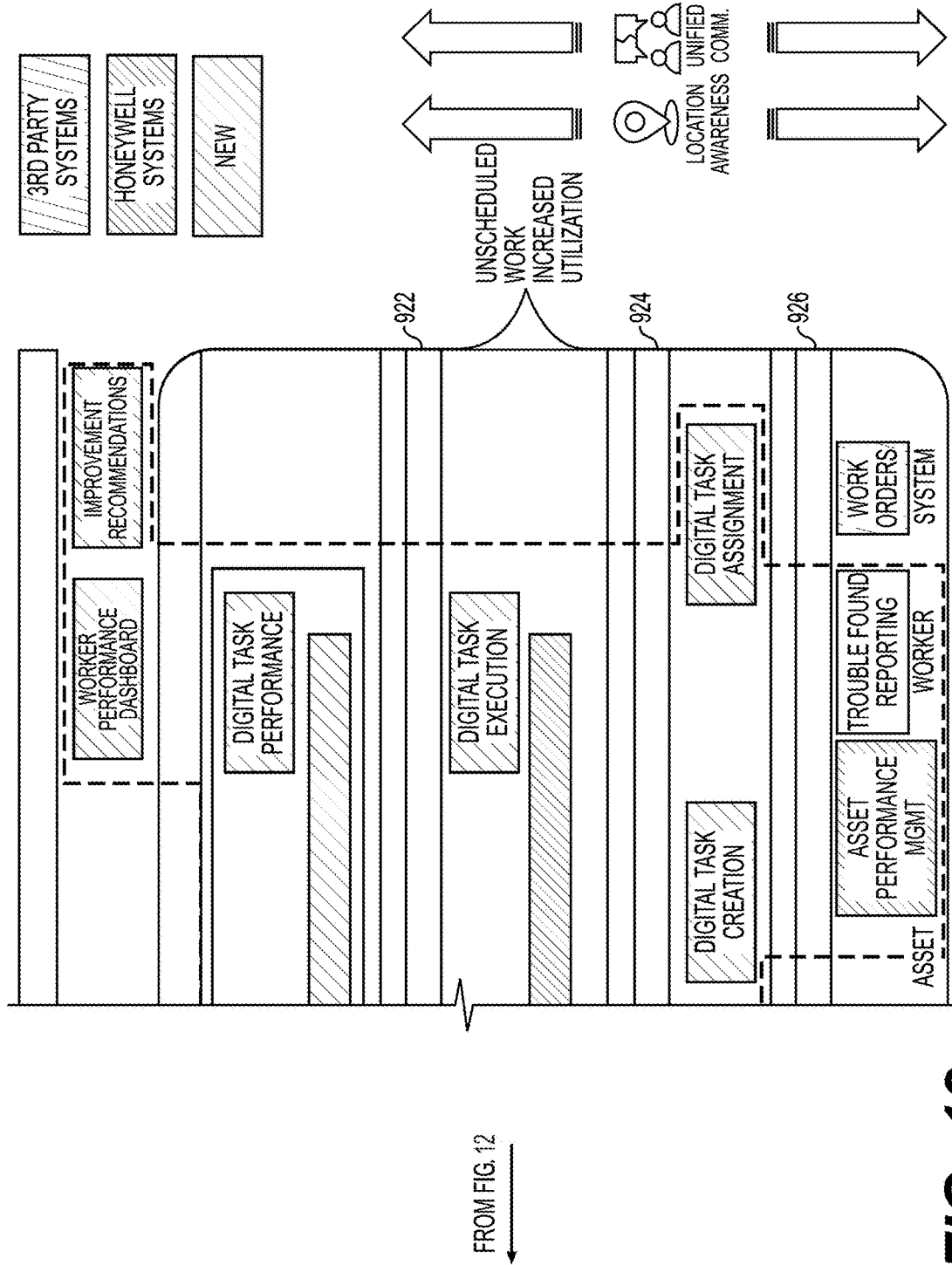

FIG. 12 is a diagram of architecture associated with of a connected warehouse system 1200 of this disclosure. System 1200 can include workforce analytic modules 1215, including but not limited to modules for dynamic work allocation, real-time worker performance metrics, worker satisfaction, etc. Workforce analytic modules 1215 can also include one or more worker performance dashboards 1223 and improvement recommendations 1225. Improvement recommendations 1225 can be for training, rewarding, coaching, engagement, etc. opportunities to maximize worker retention, performance, and overall work operations In certain aspects, worker performance dashboards 1223 and improvement recommendations 1225 can be updated (e.g., in real-time) by a system 1217 of record for worker activities and performance. System 1217 can be in communication with workforce analytic modules 1215. System 1217 can improve schedule worked productivity via labor management module 1210 and planning systems module 1220. Specifically, management module 1210 can include one or more discrete components (e.g., components to manage manufacturing operations management (MOM) labor, 3rd party activities, as well as homegrown activities) that in real-time communicate with a comprehensive data model of system 1217. The comprehensive data model of system 1217 can include a plan performance module bidirectionally coupled to labor management module 1210. The comprehensive data model of system 1217 can also include modules with digital task performance and task-level granularity. In some aspects, the plan performance module can include a database of worker digital task performance and task-level granularity (e.g., showing discrete subtasks of a task or granular performance metrics of a respective worker task).

In practice, a layer 1226 for identifying and reporting adverse conditions can be included in system 1217. Layer 1226 can include an asset performance manager (APM) as well as systems to manage worker orders. In some aspects, layer 1226 can include an operation intel manager and trouble-found reporting system that collectively work to enable layer 1226 to communicate with aspects of assignment layer 1224 downstream thereof. Layer 1226 can include a plan system in bidirectionally coupled to planning systems module 1220, including but not limited to warehouse management systems (WMS), third party systems, and the like. The operation intel manager and trouble-found of assignment layer 1226 can communicate with digital task creation and digital task assignment systems of assignment layer 1224. Assignment layer 1224 in turn can communicate with aspects of execution layer 1222 downstream thereof.

Layer 1222 can include or be coupled to one or more mobile devices (e.g., mobile devices of users and/or personnel associated therewith including employees, managers, and personnel of third parties). Layer 1222 can also include guided work software (GWS) systems. In some aspects, the digital task creation and digital task assignment systems of assignment layer 1224 can be in communication with the mobile devices of layer 1222 as well as a digital task execution system of layer 1222. In some examples, mobile devices of layer 1222 as well as a digital task execution system of layer 1222 can communicate with the task level granularity system, the plan performance system, and digital task performance system of the comprehensive data model of system 1217 to dynamically update worker performance dashboard 1223 and improvement recommendations 1225.

Figure 13:
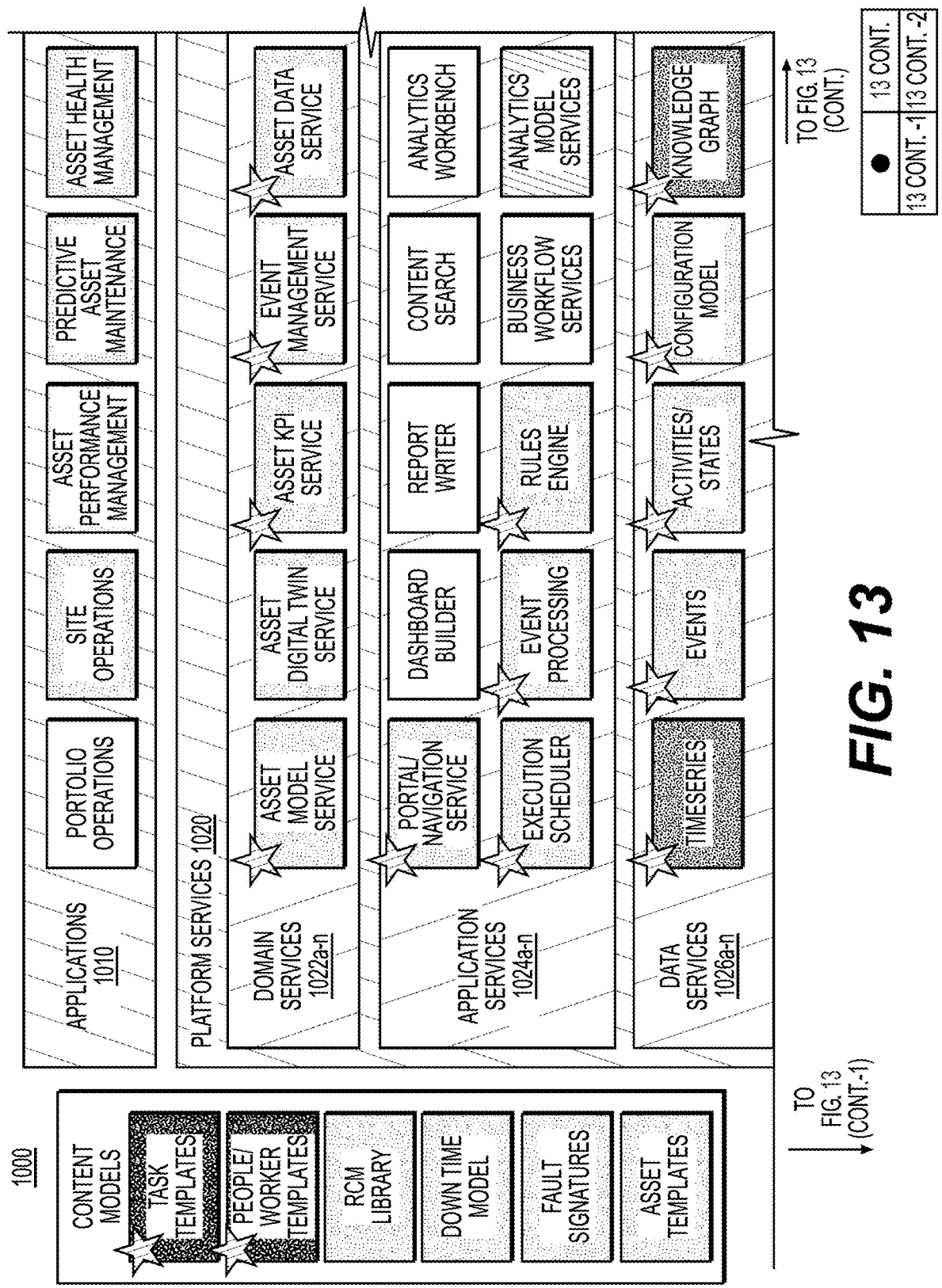
FIG. 13 is a diagram of architecture of a connected warehouse system of this disclosure.
Figure 13:
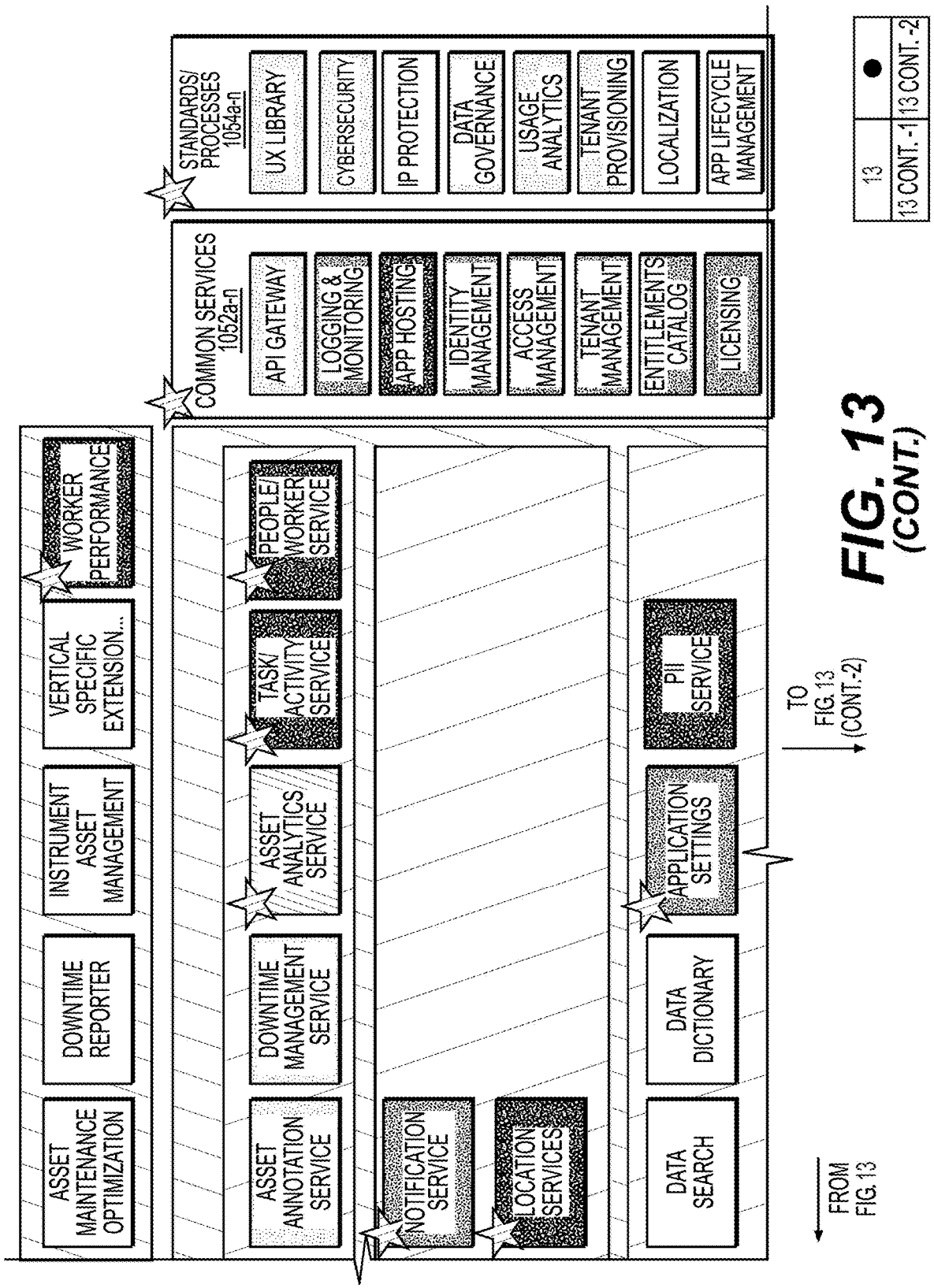

FIG. 13 is a diagram of architecture of a connected warehouse system 1300 of this disclosure. System 1300 can be a multi-layered system including an applications layer 1310, a platform services layer 1320, a common services layer 1352*a-n*, a standards and processes layer 1354*a-n*, a connectivity services layer 1340, a data sources layer 1348*a-n*, and an enterprise systems layer 1350*a-n*.

Applications layer 1310 can include a plurality of components such as applications for portfolio operations, site operations, asset performance management, predictive asset maintenance, asset health management, asset maintenance optimization, downtime reporter, instrument asset management, vertical specific extension, and worker performance.

Platform services layer 1320 can be in communication with applications layer 1310 and include a plurality of system components, including domain services 1322*a-n*, application services 1324*a-n*, data services 1326*a-n*, managed storage 1328*a-n*, and data ingestion 1330*a-n*. Domain services 1322*a-n* can include modules and/or components for asset model service, asset digital service, asset key performance indicator (KPI) service, event management service, asset data service, asset annotation service, downtime management service, asset analytics service, task/activity service, and people worker service. Preferably, domain services 1322*a-n* includes asset analytics service systems, task/activity service systems, and people worker service systems.

Application services 1324*a-n* can include modules and/or components for portal navigation service, dashboard builder, report writer, content search, analytics workbench, notification service, execution scheduler, event processing, rules engine, business workflow services, analytics model services, and location services. Some or all of components of application services 1324*a-n* can be in communication with applications of layer 1310.

Data services 1326*a-n* can include modules and/or components for time series, events, activities and states, configuration model, knowledge graph, data search, data dictionary, application settings, and personal identifying information (PII) services. Managed storage services 1328*a-n* can include databases for time series, relational, document, blob storage, graph databases, file systems, real-time analytics databases, batch analytics databases, and data caches. Managed storage services 1330*a-n* can include modules and/or components for device registration, device management, telemetry, command and control, data pipeline, file upload/download, data prep, messaging, and IoT V3 connector.

Connectivity services layer 1340 can include edge services 1342*a-n*, edge connectors 1344*a-n*, and enterprise integration 1346*a-n*. Edge services 1342*a-n* can include modules and/or components for connection management, device management, edge analytics, and execution runtime. Edge connectors 1344*a-n* can include OPC unified architecture (OPC UA), file collectors, and domain connectors. Enterprise integration 1346*a-n* can include modules and/or components for streaming, events, and/or files. Data sources layer 1348*a-n* can include modules and/or components for streaming, events, and/or files, as well as time series.

In some aspects, common services 1352*a-n* can include one or more API gateways as well as components for logging and monitoring, application hosting, identify management, access management, tenant management, entitlements catalogues, licensing, metering, subscription billing, user profiles, and/or secret store.

In some aspects, standards and processes 1354*a-n* can include one or more UX libraries as well as components for cybersecurity, IP protection, data governance, usage analytics, tenant provisioning, localization, app lifecycle management, deployment models, mobile app development, and/or marketplace.

Figure 14:
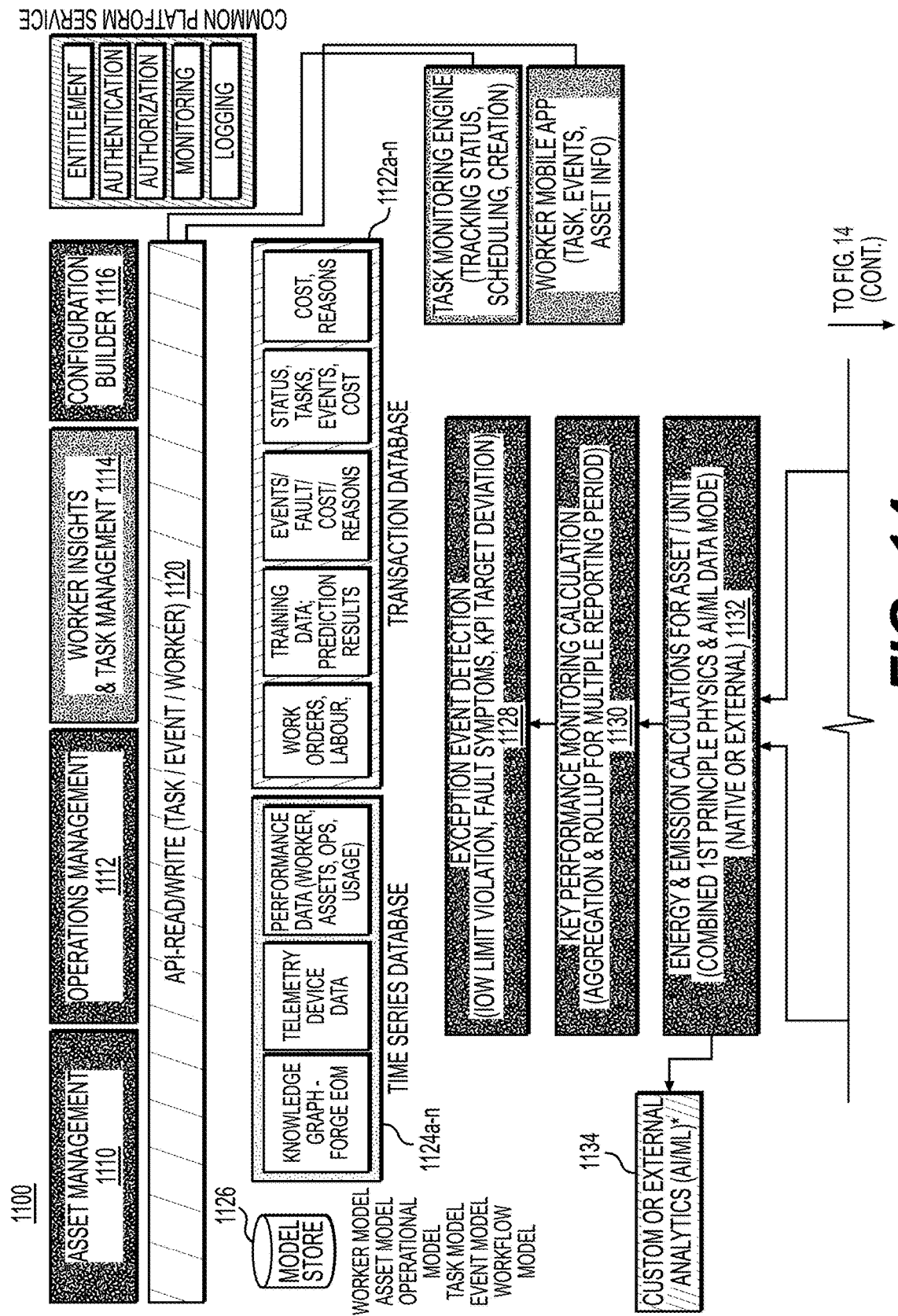
FIG. 14 depicts a schematic block diagram of a framework of a platform of a connected warehouse system.
Figure 14:
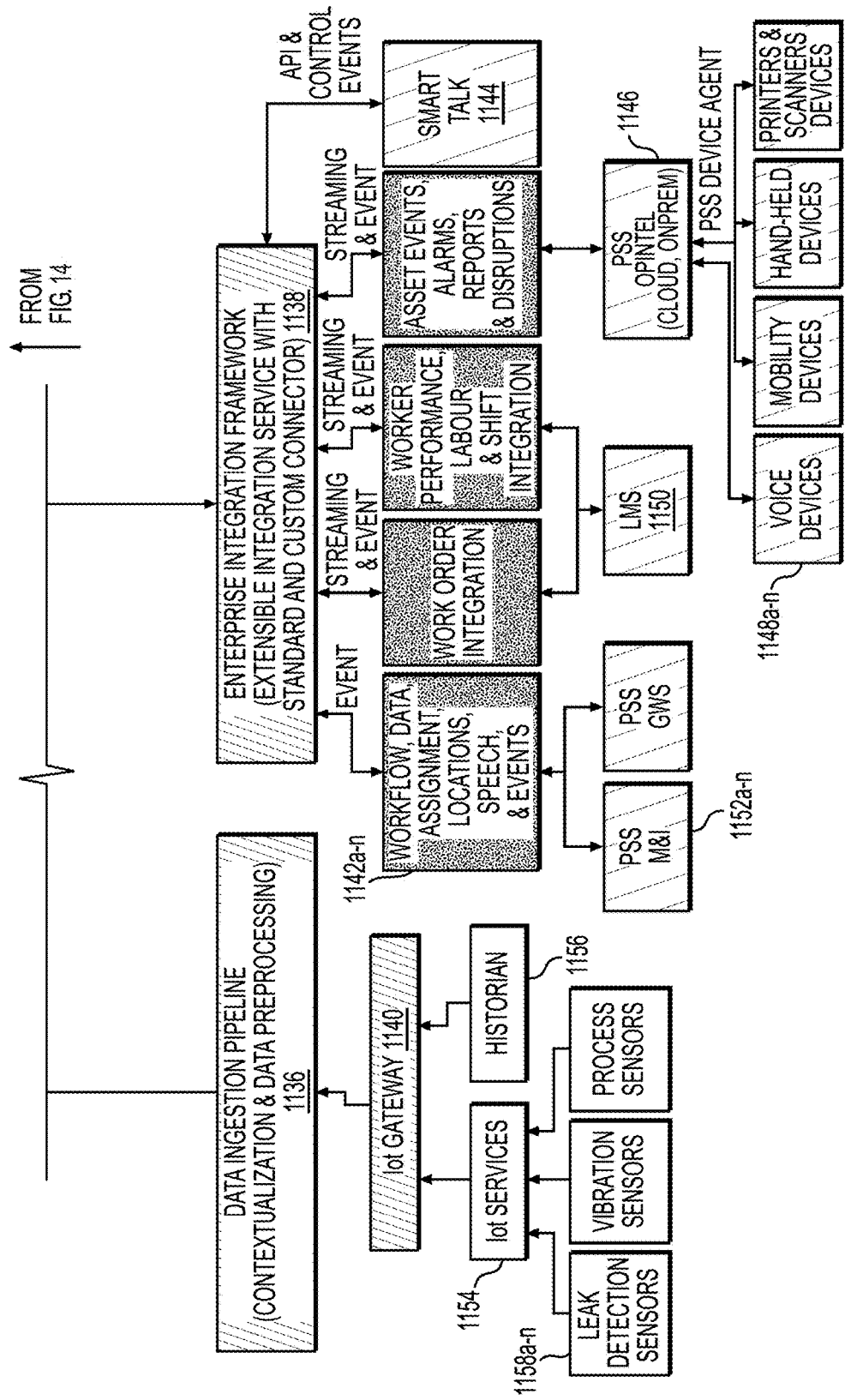

FIG. 14 depicts a schematic block diagram of a framework of a platform of a connected warehouse system 1400. System 1400 can include an asset management system 1410, operations management system 1412, worker insights and task management system 1414, and configuration builder system 1416. Each of systems 1410, 1412, 1414, and 1416 can be in communication with API 1420, whereby API 1420 can be configured to read/write tasks, events, and otherwise coordinate working with workers of system 1400. API 1420 can include a task monitoring engine configured to track status, schedule, and facilitate task creation. API 1420 can present or otherwise be accessed via a worker mobile application (e.g., a graphical user interview on a computing device) to similarly present and manage operations related to tasks, events, and asset information.

API 1420 can be communication with model store 1426 whereby model store 1426 can include models such as worker models, asset models, operational models, task models, event models, workflow models, and the like. API 1420 can be communication with time series databases 1424*a-n* and transaction databases 1422*a-n*. Time series databases 1424*a-n* can include knowledge databases, graph databases, as well as extensible object models (EOMs). Transaction databases 1422*a-n* can include components and/or modules for work orders, labor, training data, prediction results, events, fault, costs, reasons, status, tasks, events, and reasons.

Each of databases 1424*a-n*, 1422*a-n* can be in communication with analytics model 1434, which can be a machine learning model to effectively process, analyze, and classify operations of system 1400. Model 1434 can be a trained machine learning system having been trained using a learned set of parameters to predict one or more learned performance parameters of system 1400. Learned parameters can include but are not limited to predictive asset maintenance of a connected warehouse, asset health management, asset maintenance optimization, worker downtime reporter, instrument asset management, vertical specific extension, and worker performance. One or more corrective actions can be taken in response to predictions rendered by model 1434. Model 1434 can be trained with a regression loss (e.g., mean squared error loss, Huber loss, etc.) and for binary index values it may be trained with a classification loss (e.g., hinge, log loss, etc.). Machine learning systems that may be trained include, but are not limited to convolutional neural network (CNN) trained directly with the appropriate loss function, CNN with layers with the appropriate loss function, capsule network with the appropriate loss function, Transformer network with the appropriate loss function, Multiple instance learning with a CNN (for a binary resistance index value), multiple instance regression with a CNN (for a continuous resistance index value), etc.

In certain aspects, databases 1424*a-n* and 1422*a-n* can operate together to perform exception event detection 1428. Exception event detection 1428 can utilize data from one or more data sources to detect low limit violations, fault symptoms, KPI target deviations, etc. In certain aspects of exception event detection 1428, a data ingestion pipeline 1436 and enterprise integration framework 1438 can exchange information for energy and emission calculations per asset/units of system 1400. Pipeline 1436 can utilize contextual data and data preprocessing while framework 1438 can include extensible integration service with standard and customer connectors.

In certain aspects, an IoT gateway 1440 can be communicatively coupled to pipeline 1436. IoT gateway 1440 can be communicatively coupled to IoT devices 1454 such as sensors 1458*a-n*, including leak detection sensors, vibration sensors, process sensors, and/or the like. IoT gateway 1440 can also be in communication with data historian 1456 including historical data related to the warehouse.

Framework 1438 can be in communication with event manager modules 1442*a-n*, including workflow module, work order integration module, worker performance module, asset event module, and the like. For events, the workflow module can be configured to bidirectionally communicate with framework 1438 and components of process workflow data 1452*a-n*, including Process Safety Suite (PSS) maintenance and inspection (M&I) and PSS GWS. For event streaming, work order integration module and worker performance module can both be configured to bidirectionally communicate with framework 1438 and labor management systems (LMS) 1450. In some aspects, for event streaming asset event module can also be configured to bidirectionally communicate with PSS operational intelligence systems 1446 and framework 1438. PSS operational intelligence systems 1446 in turn can be cloud-based and/or on premises and be in bidirectional communication with devices 1448*a-n*, including voice devices, mobility devices, hand-held devices, printers, scanners, and/or the like. Framework 1438 can also be in communication with start talk module 1444 for corresponding API and event control.

In aspects of system 1400, pipeline 1436 and framework 1438 work together to perform step 1432 to calculate energy and emission calculations for assets and/or associated units. Model 1434 can be used in performing step 1432 as well as other native and/or external models connected therewith, whereby step 1432 can utilize data received from pipeline 1436 and framework 1438.

Upon completing step 1432, key performance monitoring calculations can be performed in step 1430. Step 1430 can be performed based on energy and emission calculations from step 1432 by aggregating and rollup across one or multiple reporting periods. Upon performing step 1430, the aforementioned event exception detection step 1428 can be performed to detect exception events. In some aspects, step 1428 can be performed based on the key performance monitoring calculations of step 1430.

Figure 15A:
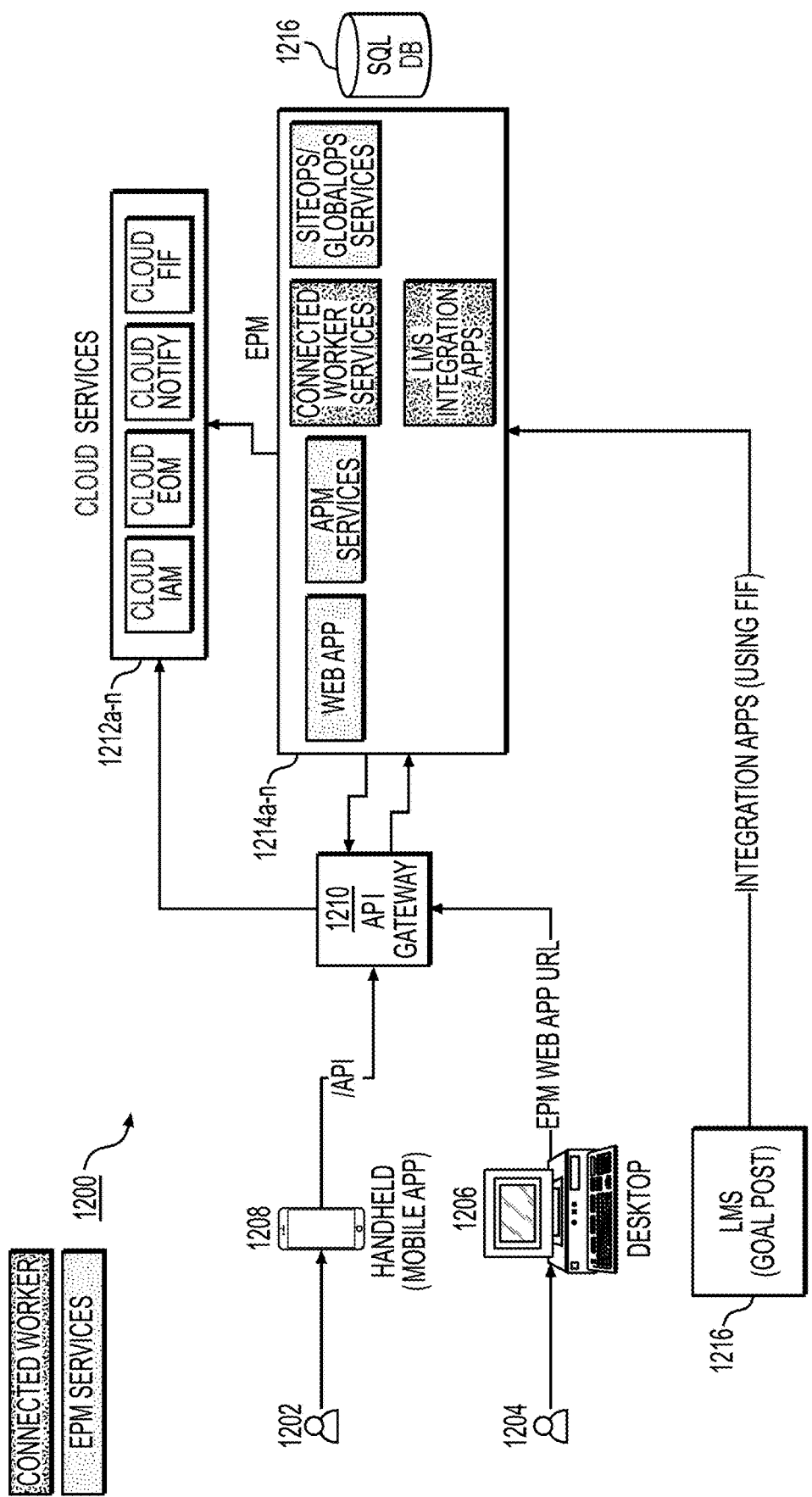
FIG. 15A depicts an exemplary diagram of a data flow of a connected warehouse, according to one or more embodiments.

FIG. 15A is a diagram of data flow 1500 of a connected warehouse system, including one with connective workers and performance management (EPM) service systems. In step 1504, an operator and/or engineer may use a computing device 1506 to manage system performance through a user interface (e.g., a web-based or browser-based application) using system gateway 1510, which can be a cloud based. In step 1502, a user (e.g., worker, manager, and/or the like) may use an app in a computing device 1508 (e.g., mobile device such as a tablet or smart phone or any personal computing device) via an API to communicate and exchange data with gateway 1510.

Warehouse system services 1512*a-n* can be configured in communication with gateway 1510 (e.g., receive data from gateway 1510 from steps 1502 and 1504). Services 1512*a-n* can be configurable to communicate and/or update in real-time functions such as identify and access management (IAM), system extensible object model (EOM), notifications, fire and gas instrumented function (FIF), etc. Performance management system 1514*a-n* can be configured to transmit data to warehouse system services 1512*a-n* while receiving data from LMS 1516. Based on said data from LMS 1516, real-time adjustments can be determined for a labor management plan associated with the warehouse and/or workers. In some aspects, the labor management plan can be updated by system 1514*a-n* being in bidirectional communication with gateway 1510. System 1514*a-n* can include or otherwise be in communication with corresponding web apps, asset performance management (APM) services, connected worker services, LMS integration applications, site operation services, and global operation services. System 1514*a-n* can be connected to one or more cloud-based databases (e.g., SQL DB 1516). One or more components of system 1514*a-n* can be part of computing devices and/or sensors associated with workers connected to the system.

LMS 1516 can be configured to control labor costs, track performance, and predict one or more parameters associated with performance (e.g., project fulfillment execution) and transmit and/or otherwise present such information in LMS system integration applications (e.g., using FIF). In turn, system 1514*a-n* can configured to consume data from LMS 1516, gateway 1510, devices 1508 and 1506, and services 1512*a-n* to deliver one or more inferences to end users (e.g., one or more actions that the end-user can take or a corresponding employee or employees associated with one or more tasks) to result in changing a warehouse operation, such as warehouse operation savings. Warehouse operation savings can be directed towards safety, maintenance, performance, resource conservation, deliverable management, inventory management, etc.). An actionable update (e.g., a sync) may then be made to data flow 1500.

Figure 15B:
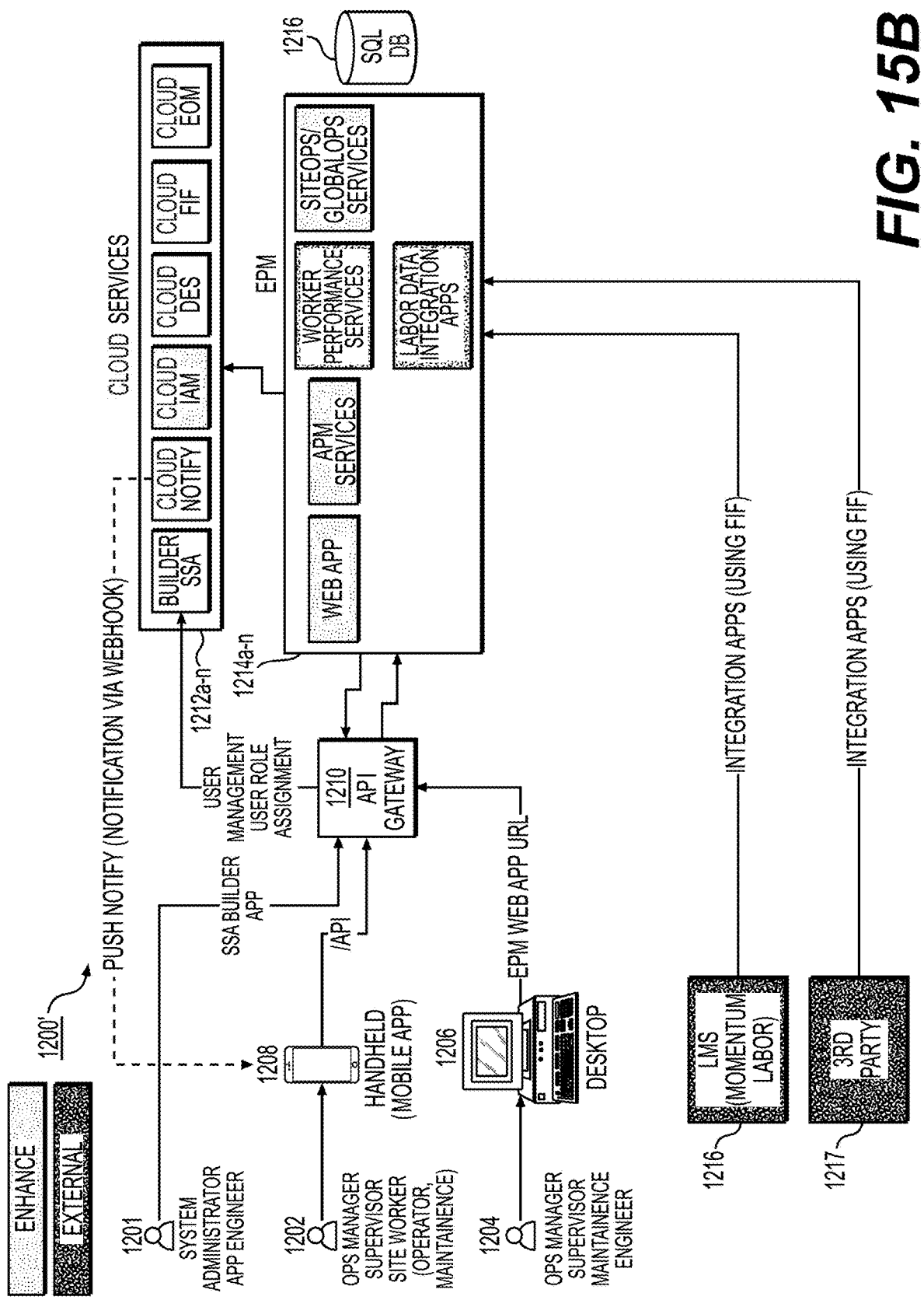
FIG. 15B depicts an exemplary diagram of a data flow of a connected warehouse, according to one or more embodiments.

FIG. 15B is a diagram of data flow 1500' of a connected warehouse system. In addition to previous steps 1502 and 1504, data flow 1500' provides step 1501 in which a system administrator and/or application engineer may manage system performance through a user interface (e.g., a web-based or browser-based application) using system gateway 1510, which can be a cloud based. In data flow 1500', one or more services of services 1512*a-n* (e.g., such as the notifications module) can push messages or otherwise push notify (e.g., notification via webhook) from services 1512*a-n* to device 1508. In some aspects, data flow 1500' provides that performance management system 1514*a-n* can receive data from LMS 1516 and one or more third party systems 1517. Based on said data from LMS 1516 and one or more third party systems 1517, real-time adjustments can be determined for a labor management plan associated with the warehouse and/or workers. In some aspects of data flow 1500', the labor management plan can be updated by system 1514*a-n* being in bidirectional communication with gateway 1510.

Aspects of FIGS. 1-16B are advantageous for measuring Worker assignment/task progress in contextually relevant dimensions, visualize in real-time, and alert users (e.g., supervisor(s) and/or stakeholder(s)) upon identified anomalous trend deviations from rates of worker KPIs.

Figure 16:
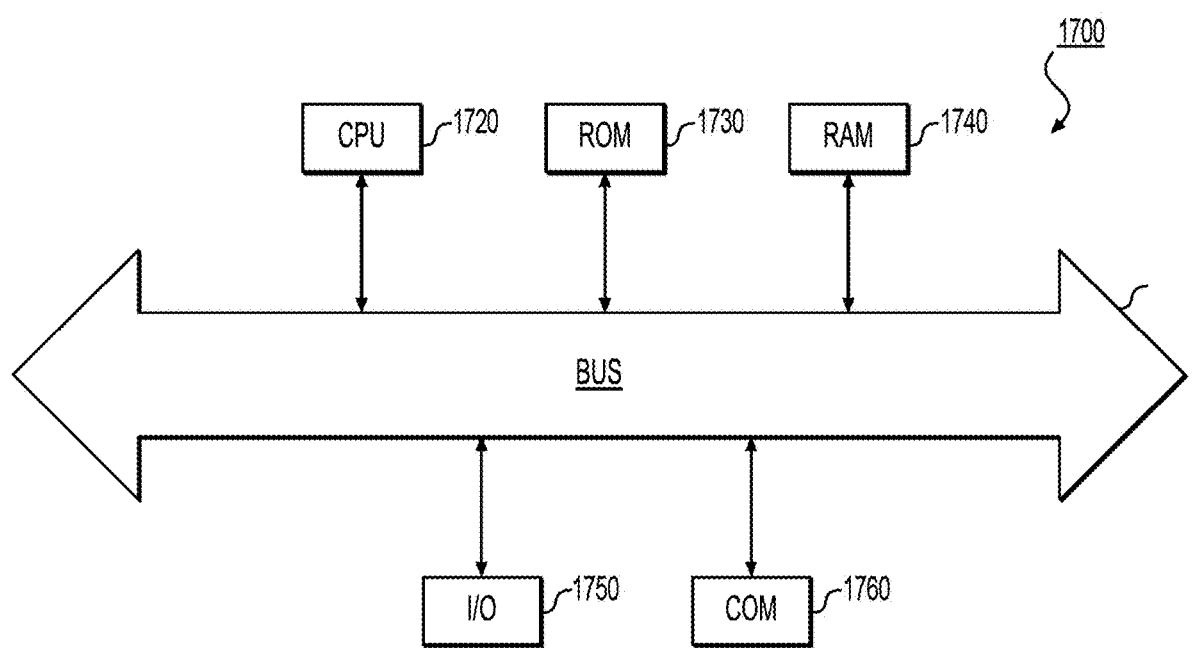
FIG. 16 illustrates an exemplary device in which one or more embodiments may be implemented.

Various embodiments of the present disclosure (e.g., edge systems, gateway systems, operations centers, remote systems, warehouse systems, connected worker systems, etc.), as described above with reference to FIGS. 1-15B may be implemented using device 1600 in FIG. 16. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 16, device 1600 may include a central processing unit (CPU) 1620. CPU 1620 may be any type of processor device including, for example, any type of special purpose or a general purpose microprocessor device. As will be appreciated by persons skilled in the relevant art, CPU 1620 also may be a single processor in a multi-core/multi-processor system, such system operating alone, or in a cluster of computing devices operating in a cluster or server farm. CPU 1620 may be connected to a data communication infrastructure 1610, for example, a bus, message queue, network, or multi-core message-passing scheme.

Device 1600 may also include a main memory 1640, for example, random access memory (RAM), and may also include a secondary memory 1630. Secondary memory 1630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1630 may include other similar means for allowing computer programs or other instructions to be loaded into device 1600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1600.

Device 1600 may also include a communications interface ("COM") 1660. Communications interface 1660 allows software and data to be transferred between device 1600 and external devices. Communications interface 1660 may include a modem, a network interface (such as an Ethernet card), a communications port, a PCMCIA slot and card, or the like. Software and data transferred via communications interface 1660 may be in the form of signals, which may be electronic, electromagnetic, optical, or other signals capable of being received by communications interface 1660. These signals may be provided to communications interface 1660 via a communications path of device 1600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1600 also may include input and output ports 1650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems and methods of this disclosure can be cloud-based, multi-tenant solutions configured to deliver optimized work instructions tailored for specific vertical workflows utilizing an easy to deploy, scalable, and configurable data model and software suite to deliver performance insights and improve worker productivity.

The disclosure provides one or more user interface systems for smart worker performance scoring and evaluation of a job site (e.g., one or more warehouses), whereby information from sensors and/or connected worker computing devices may provide dynamic data about job performance (e.g., productivity of worker(s), task productivity, production productivity, etc.), a processor and database(s) for receiving and processing the dynamic data, and having a program that aggregates and analyzes the dynamic data for one or more categories of the one or more worker performance. The data analysis may determine performance scores for each of the one or more performance categories, and calculate an overall worker performance score. The worker performance score for each category of this disclosure may be displayed on a dashboard and/or related scorecards. In some aspects, one or more functions are used to calculate scores (e.g., assigning a coefficient factor to values of categories such as time on task, time between tasks, number of tasks completed, idle state, etc.). The coefficient factor may be determined from a comparison value based on some predetermined standard and/or worker performance historical data of the one or more categories. Any of the herein disclosed dashboards and related user interfaces may present worker performance scores and related details of the dynamic data for detecting and solving worker performance issues (e.g., recommended corrective actions) without changing the dashboard or the monitor.

The worker performance scores of this disclosure can include numerous scores and sub-scores, including performance scores, environmental scores related to the job site and/or areas of a job site (e.g., utility consumption, carbon footprint, emissions, etc.), health scores, safety scores, maintenance scores, job site asset scores, happiness scores, etc. Such scores are also advantageous for use in using trained machine learning models to predict performance impacts depending on trends of all such scores of this disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method of operating a warehouse by performing, by at least one processor, operations comprising:
    connecting a gateway device with a data ingestion pipeline for collecting information, the data ingestion pipeline being in communication with a plurality of worker computing devices and a plurality of sensor devices, the worker computing devices each relating to one or more workers of a plurality of workers, wherein the gateway device is embedded in the warehouse, and wherein real-time data and stored data that are captured by the plurality of sensor devices is transmitted directly to the gateway device, and wherein the real-time data and the stored data are related to one or more events in the warehouse;
    connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules configured to route, events and instructions between PSS devices and the gateway device;
    determining, based on information received from the plurality of worker computing devices, the plurality of sensor devices, and plurality of PSS devices, that a worker is requesting a template to generate a task or event;
    retrieving the template from a memory, the template having information corresponding to the task or the event associated with the warehouse;
    sending the template to the worker computing device associated with the worker requesting the template;
    sending a prompt to input data into the template on the worker computing device;
    uploading the input data from the template to a dashboard accessible from the plurality of worker computing devices, the input data indicating a creation of a new task and/or a new event;
    tracking, via one or more external devices, real-time progress of the one or more worker corresponding to the new task and/or the new event; and
    generating an alert based on anomalous trend deviations in the real-time progress.

2. The method of claim 1, wherein the information received from the data ingestion pipeline is at least one of a video, a photo, an audio transmission, or a text transmission.

3. The method of claim 2, wherein the template is one of a plurality of templates stored in the memory, and the step of retrieving the template comprises determining that the template corresponds to the task or the event that correlates with the information received from the plurality of worker computing devices, the plurality of sensor devices, and plurality of PSS devices.

4. The method of claim 3, wherein the template includes pre-filled information based on the worker requesting the template.

5. The method of claim 1, wherein the template comprises data fields for: a title, a description of the task or the event, a category, a location, a sub-location, a due date or expiration date, an identification of people to be notified that a task or event has been generated, an identification of people to be notified that a task or event has been assigned to them, a priority level, and/or a recurrence interval.

6. The method of claim 1, further comprising sending notifications to the worker computing devices associated with workers that are identified as supervising and/or performing the new task or new event.

7. The method of claim 1, wherein the memory comprises a template store, and the plurality of templates stored in the template store is dynamically updated with new templates periodically.

8. A system for exchanging real-time data in a warehouse, comprising:
    one or more processors; and
    a non-transitory computer readable medium storing instructions that, when executed by the one or more processors, cause the one or more processors to perform:
        connecting a gateway device with a data ingestion pipeline for collecting information, the data ingestion pipeline being in communication with a plurality of worker computing devices and a plurality of sensor devices, the worker computing devices each relating to one or more workers of a plurality of workers, wherein the gateway device is embedded in the warehouse, and wherein real-time data and stored data that are captured by the plurality of sensor devices is transmitted directly to the gateway device, and wherein the real-time data and the stored data are related to one or more events in the warehouse;

connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules configured to route, events and instructions between PSS devices and the gateway device;

determining, based on information received from the plurality of worker computing devices, the plurality of sensor devices, and plurality of PSS devices, that a worker is requesting a template to generate a task or event;

retrieving the template from a memory, the template having information corresponding to the task or the event associated with the warehouse;

sending the template to the worker computing device associated with the worker requesting the template;

sending a prompt to input data into the template on the worker computing device;

uploading the input data from the template to a dashboard accessible from the plurality of worker computing devices, the input data indicating a creation of a new task and/or a new event;

tracking, via one or more external devices, real-time progress of the one or more worker corresponding to the new task and/or the new event; and generating an alert based on anomalous trend deviations in the real-time progress.

9. The system of claim 8, wherein the information received from the data ingestion pipeline is at least one of a video, a photo, an audio transmission, or a text transmission.

10. The system of claim 9, wherein the template is one of a plurality of templates stored in the memory, and the step of retrieving the template comprises determining that the template corresponds to the task or the event that correlates with the information received from the plurality of worker computing devices, the plurality of sensor devices, and plurality of PSS devices.

11. The system of claim 10, wherein the template includes pre-filled information based on the one or more worker requesting the template.

12. The system of claim 8, wherein the template comprises data fields for: a title, a description of the task or event, a category, a location, a sub-location, a due date or expiration date, an identification of people to be notified that a task or event has been generated, an identification of people to be notified that a task or event has been assigned to them, a priority level, and/or a recurrence interval.

13. The system of claim 8, further comprising sending notifications to the worker computing devices associated with workers that are identified as supervising and/or performing the new task or new event.

14. The system of claim 8, wherein the memory comprises a template store, and the plurality of templates stored in the template store is dynamically updated with new templates periodically.

15. A non-transitory computer readable medium storing instructions that, when executed by one or more processors, cause the one or more processors to perform a method of operating a warehouse comprising:

connecting a gateway device with a data ingestion pipeline for collecting information, the data ingestion pipeline being in communication with a plurality of worker computing devices and a plurality of sensor devices, the worker computing devices each relating to one or more workers of a plurality of workers, wherein the gateway device is embedded in the warehouse, and wherein real-time data and stored data that are captured by the plurality of sensor devices is transmitted directly to the gateway device, and wherein the real-time data and the stored data are related to one or more events in the warehouse;

connecting the gateway device with a plurality of process safety suite (PSS) devices in communication with a system integration framework, the PSS devices comprising one or more voice devices, mobility devices, hand-held devices, printers, and/or scanners, the system integration framework comprising a plurality of event manager modules configured to route, events and instructions between PSS devices and the gateway device;

determining, based on information received from the plurality of worker computing devices, the plurality of sensor devices, and plurality of PSS devices, that a worker is requesting a template to generate a task or event;

retrieving the template from a memory, the template having information corresponding to the task or the event associated with the warehouse;

sending the template to the worker computing device associated with the worker requesting the template;

sending a prompt to input data into the template on the worker computing device;

uploading the input data from the template to a dashboard accessible from the plurality of worker computing devices, the input data indicating a creation of a new task and/or a new event;

tracking, via one or more external devices, real-time progress of the one or more worker corresponding to the new task and/or the new event; and generating an alert based on anomalous trend deviations in the real-time progress.

16. The non-transitory computer readable medium of claim 15, wherein the information received from the data ingestion pipeline is at least one of a video, a photo, an audio transmission, or a text transmission.

17. The non-transitory computer readable medium of claim 16, wherein the template is one of a plurality of templates stored in the memory, and the step of retrieving the template comprises determining that the template corresponds to the task or the event that correlates with the information received from the plurality of worker computing devices, the plurality of sensor devices, and plurality of PSS devices.

18. The non-transitory computer readable medium of claim 17, wherein the template includes pre-filled information based on the one or more worker requesting the template.

19. The non-transitory computer readable medium of claim 15, wherein the template comprises data fields for: a title, a description of the task or event, a category, a location, a sub-location, a due date or expiration date, an identification of people to be notified that a task or event has been generated, an identification of people to be notified that a task or event has been assigned to them, a priority level, and/or a recurrence interval.

20. The non-transitory computer readable medium of claim 15, further comprising sending notifications to the worker computing devices associated with workers that are identified as supervising and/or performing the new task or new event.

* * * * *